United States Patent
Belli et al.

(10) Patent No.: US 9,757,685 B2
(45) Date of Patent: Sep. 12, 2017

(54) AQUEOUS LIME SLURRY, PREPARATION PROCESS AND USES

(71) Applicant: COATEX, Genay (FR)

(72) Inventors: Fabrizio Belli, Sedrina BG (IT); Jacques Mongoin, Quincieux (FR); Angelo Berlendis, Torre de Roveri BG (IT)

(73) Assignee: COATEX, Genay (FR)

( * ) Notice: Subject to any disclaimer, the term of this patent is extended or adjusted under 35 U.S.C. 154(b) by 539 days.

(21) Appl. No.: 14/082,253

(22) Filed: Nov. 18, 2013

(65) Prior Publication Data

US 2014/0140907 A1    May 22, 2014

Related U.S. Application Data

(60) Provisional application No. 61/738,516, filed on Dec. 18, 2012, provisional application No. 61/738,525, filed on Dec. 18, 2012.

(30) Foreign Application Priority Data

Nov. 19, 2012  (FR) .................................... 12 60968
Nov. 19, 2012  (FR) .................................... 12 60970

(51) Int. Cl.
*B01D 53/48*   (2006.01)
*B01D 53/50*   (2006.01)
*C01F 11/02*   (2006.01)
*B01F 3/08*    (2006.01)

(52) U.S. Cl.
CPC ........... *B01D 53/48* (2013.01); *B01D 53/502* (2013.01); *B01D 2251/404* (2013.01); *B01F 3/0811* (2013.01); *C01F 11/02* (2013.01)

(58) Field of Classification Search
CPC ............................... B01F 3/0811; C01F 11/02
USPC .... 516/78, 88, 924, 929–931; 423/155, 158, 423/159, 635, 636
See application file for complete search history.

(56) References Cited

U.S. PATENT DOCUMENTS

| | | | |
|---|---|---|---|
| 5,275,650 A | 1/1994 | Mongoin et al. | |
| 6,093,764 A | 7/2000 | Egraz et al. | |
| 2004/0019148 A1 | 1/2004 | Suau et al. | |
| 2004/0129175 A1* | 7/2004 | Butters ................ | B01D 53/501 106/461 |
| 2005/0143511 A1 | 6/2005 | Suau et al. | |
| 2009/0326101 A1 | 12/2009 | Suau et al. | |
| 2011/0319526 A1 | 12/2011 | Suau et al. | |
| 2012/0227634 A1 | 9/2012 | Suau et al. | |

FOREIGN PATENT DOCUMENTS

| | | |
|---|---|---|
| EP | 0 313 483 A1 | 4/1989 |
| EP | 0 892 020 A1 | 1/1999 |
| FR | 2 810 261 A1 | 12/2001 |
| FR | 2 913 420 A1 | 9/2008 |
| FR | 2 939 055 A1 | 6/2010 |
| JP | 9-122471 A | 5/1997 |

OTHER PUBLICATIONS

International Search Report issued Feb. 12, 2014 in PCT/FR2013/052765 (with English translation of categories of cited documents).

* cited by examiner

*Primary Examiner* — Matthew E Hoban
*Assistant Examiner* — James Fiorito
(74) *Attorney, Agent, or Firm* — Oblon, McClelland, Maier & Neustadt, L.L.P.

(57) ABSTRACT

Preparation of aqueous slurries of calcium dihydroxide. Preparation of aqueous suspensions of calcium hydroxide.

10 Claims, No Drawings

AQUEOUS LIME SLURRY, PREPARATION PROCESS AND USES

This application claims benefit to French patent applications FR 12 60968 and FR 12 60970, both filed Nov. 19, 2012, and to two U.S. provisional applications, U.S. 61/738,516 and U.S. 61/738,525, both filed Dec. 18, 2012, all four documents being incorporated herein by reference in their entireties.

The present invention relates to the technical field of the preparation of aqueous slurries of calcium dihydroxide. Specifically, the present invention concerns a lime-based slurry including a new additive as well as a process for the preparation of such a slurry. Such slurries are used in particular as a chemical neutralization agent in domestic or industrial processes.

Calcium dihydroxide $Ca(OH)_2$, also known as slaked lime or hydrated lime, is obtained by hydration of calcium oxide CaO, also known as quicklime, according the following exothermic reaction:

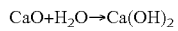

$$CaO + H_2O \rightarrow Ca(OH)_2$$

In the context of the present invention, the terms "calcium hydroxide" or the terms "calcium dihydroxide" are used in an equivalent manner to designate particles of $Ca(OH)_2$.

Calcium hydroxide-based products come in various forms: in the form of powder (dry product in powdery form), in the form of plastic pastes, or in the form of aqueous slurries/dispersions (milk-of-lime).

The present invention relates more specifically to a calcium hydroxide-based product which is in the form of an aqueous slurry. Such aqueous slurries of slaked lime can be used as chemical neutralization agents in many industrial processes. An example that can be cited is the treatment of industrial effluents, for example gases such as acid smoke. The treatment of potable water, wastewater or industrial water are also examples.

Aqueous slurries of slaked lime are characterized in particular by their dry solids content (% by weight). The person skilled in the art typically seeks to increase the dry solids content in aqueous slurries of slaked lime for reasons that are primarily economic: by increasing the dry solids content of aqueous slurries of slaked lime, the relative cost of transport and handling per tonne of product is thereby reduced. In addition, the nuisance due to the handling of powders (hygiene, handling) is reduced, and processing is facilitated.

To increase the dry solids content of aqueous slurries of slaked lime, a dispersant can be used.

A "dispersant" means an agent that has the ability to improve the dispersion state of $Ca(OH)_2$ particles in an aqueous slurry.

Specifically, when these agents are used in aqueous slurries of mineral material, they induce a decrease in viscosity. Thus, an aqueous slurry of mineral material containing a dispersant will have a viscosity that is less than that of the same aqueous slurry of mineral material that does not contain the said dispersant.

A certain number of documents of the prior art describe the use of dispersants.

Document EP 0 061 354 (Blue Circle) describes the implementation of anionic oligomeric polyelectrolytes, for example, homopolymers of (meth)acrylic acid, carboxymethyl cellulose or sulphonate, for making aqueous dispersions of slaked lime.

Document FR 2 677 351 (Italcementi) describes a concentrated aqueous slurry of calcium hydrate that contains at least 40% solid hydrated lime obtained from powdered hydrated lime, slaked lime or quicklime, and a water-soluble polymer that can be a polyacrylate of an alkali or alkaline-earth metal.

Document EP 0 594 332 (Rohm & Haas) describes the use of anionic polymeric dispersants to obtain aqueous dispersions of quicklime or slaked lime. These dispersants are chosen from homopolymers, copolymers and terpolymers having carboxylic acid, sulphonic acid or phosphonic acid functionalities. The monomers that confer such an acid functionality include, for example, acrylic acid, methacrylic acid, crotonic acid, maleic acid, maleic anhydride, itaconic acid, mesaconic acid, fumaric acid, citraconic acid, vinyl acetic acid, acryloxy propionic acid, vinyl sulfonic acid, styrene sulfonic acid, 2-acrylamido-2-methylpropane sulfonic acid, allylsulfonic acid, allyl phosphonic acid, vinyl phosphonic acid and vinyl sulfonic acid.

Document US 2008/0011201 (Ultimate Nominees) describes the combined use of a polycarboxylate dispersant and a carbohydrate dispersant to prepare a milk-of-lime for applications in the food and potable water field. In particular, according to this document, the carbohydrate dispersant is a sugar, chosen notably from among the aldoses, saccharides, disaccharides and polysaccharides. Also, examples of polycarboxylate dispersants are in particular the styrene maleic anhydride copolymer salts or the polyether polycarboxylate salts. In particular, this document describes the combined use of a comb-type copolymer, namely Ethacryl® G (a polycarboxylate dispersant from the Coatex company) and a glucose syrup (carbohydrate dispersant) to prepare a 50% hydrated lime slurry/dispersion.

Document EP 0 848 647 (Chemical Lime Company) describes the use of a dispersant of the anionic polyelectrolyte type in combination with an alkali metal hydroxide to prepare a lime slurry which can be of quicklime or slaked lime. The anionic polyelectrolyte is chosen from among polyacrylic acid, polycarboxylic acid, polycarboxylic acid and polyphosphoric acid, the copolymers of polyacrylic acid, polycarboxylic acid and polyphosphoric acid and their alkali metal salts.

Document FR 6 687 396 (Lhoist) describes a calcium oxide or magnesium oxide quenching process that takes place in the presence of $SO_3^-$, $SO_4^{2-}$, or $Cl^-$ ions and in which, in the course of the reaction or at the end of the reaction, a polymer or copolymer is added that includes monomers chosen from among acrylic acid and its salts, methacrylic acid and its salts, vinylbenzylsulfonic acid and its salts, acrylamido-2-methylpropane-sulphonic acid and its salts, 2-sulfoethyl methacrylate and its salts.

Document JP 09 122471 (Nippon Shokubai) describes the use of copolymers consisting of a carboxylic monomer and a monomer of the polyalkylene glycol (meth)acrylate type as a dispersant for obtaining aqueous dispersions of slaked lime with a low viscosity. This document illustrates the use for this purpose of copolymers whose molecular weight is less than 20,000 g/mol.

Document WO 2010/106111 (Lhoist) refers to compositions including slaked lime and/or quicklime and an organic polymer incorporated in the solid phase of the slaked lime. The polymers described in this document can be non-ionic, anionic, cationic or amphoteric, and of a highly varied nature. They can be obtained from monomers chosen from among the anionic monomers with a carboxylic group or with a sulfonic acid group, the non-ionic monomers (acrylamide, methacrylamide, N-vinyl pyrrolidone, vinyl acetate, vinyl alcohol, acrylate esters, allyl alcohol, N-vinyl acetamide, N-vinylformamide) the cationic monomers (ADAME, MADAME quaternized or salified, DADMAC, APTAC, MAPTAC), possibly in association with one or more hydrophobic monomers preferentially chosen from the group including the (meth)acrylic acid esters with an alkyl, arylalkyl and/or ethoxylated chain, the allylic cationic derivatives, the anionic or cationic hydrophobic (meth) acriloyl derivatives, or the anionic and/or cationic (meth) acrylamide derivatives with a hydrophobic chain.

When using the polymers of the prior art, the inventors have nevertheless found a sedimentation problem when slurries are stored without agitation for a period exceeding 3 days, especially during their transport.

A paste is then formed at the bottom of tanks containing the slurries which makes their pumping difficult or even impossible.

In addition, the inventors have also noted that this problem of sedimentation was due to a poorly adapted rheology of the currently available slurries, and to a bad disagglomeration of lime particles.

The processes and dispersants available at present do not allow aqueous slurries of lime to be obtained that provide total satisfaction, particularly in terms of sedimentation and rheological properties.

An object of the present invention is to avoid the problem of sedimentation when lime slurries are stored without agitation.

Another object of the present invention is to provide aqueous slurries of lime that are as concentrated as possible and that exhibit a rheology that is adapted to their uses in industrial processes.

An object of the present invention is to provide a process for the preparation of an aqueous slurry of slaked lime that can easily be implemented.

Unexpectedly, the inventors have revealed that by submitting a concentrated aqueous slurry of lime to a shearing operation under specific conditions in the presence of a polymer with a particular structure, it was possible to obtain concentrated and stable aqueous slurries over time.

More specifically, the objective of the present invention is a process for the preparation of an aqueous slurry of calcium hydroxide with a dry content of at least 40% by weight, with the viscosity of the said aqueous slurry measured by a Brookfield DVIII viscometer at 10 RPM being between 25 and 1,000 mPa·s at 20° C., including the steps consisting of:

a) the availability of a specific volume of an aqueous solution,
b) the availability of a specified quantity of powdered calcium hydroxide,
c) the availability of a specified quantity of a copolymer consisting:
of methacrylic acid monomers and/or any of its salts,
possibly of acrylic acid monomers and/or any of its salts,
monomers with the formula (I):

(I)

according to which:
R represents a polymerisable unsaturated group, notably acrylate, methacrylate, methacrylurethane, vinyl or allyl,
R' represents hydrogen or an alkyl group with from 1 to 4 carbon atoms,
X represents a structure with n unit(s) of ethylene oxide EO and m unit(s) of propylene oxide PO, arranged randomly or regularly,
m and n are 2 non-zero integers and are between 1 and 150, d) to at least a portion of said aqueous solution, at least part of the amount of the said copolymer is added under agitation.
e) to the aqueous solution of step d), at least a part of the said quantity of the said calcium hydroxide is added under agitation.
f)) a homogeneous shear level greater than 50,000 s$^{-1}$ is applied to the mixture resulting from step e),
g) possibly, in the course of phase f), the remaining quantity of the said copolymer and/or of the said calcium hydroxide is added.

In fact, the inventors realized that for aqueous slurries with the properties of stability over time and the concentration expected, it was necessary:
to disperse the particles of calcium hydroxide in the presence of a water-soluble copolymer of the comb type with a (meth)acrylic acid skeleton and poly(alkyleneglycol) side chains with a particular structure,
to apply a shear with a level higher than a critical shear threshold,
to use a shearing device such that the entire aqueous slurry is subject to the critical shear threshold, and
that the said aqueous slurry has concentrations of calcium hydroxide and copolymer that are such as to allow the application of a mechanical stress that is sufficient to deflocculate the particles of calcium hydroxide during shearing.

To be more precise, a homogeneous shear is applied to the said aqueous slurry. "Homogeneous shear" means a shear which has the effect of applying the same mechanical stress to all parts of the aqueous slurry thus treated.

In fact, some shearing devices have a configuration such that they can ensure that the entire aqueous slurry of lime is subjected to the mechanical stress of the expected shear.

The present invention is based on the combination of a specific process and a particular (meth)acrylic copolymer.

In general, it is noted that in the context of the present invention, all the methods of embodiment of the invention can be combined.

According to the present invention, the term "slurry", or alternatively, in an equivalent manner, "dispersion", means an aqueous slurry containing solids and at least one additive.

According to the present invention, the aqueous slurry has a viscosity measured by a Brookfield DVIII viscometer at 10 RPM which is between 25 and 1,000 mPa·s at 20° C.

It should be noted that at viscosity values higher than 1,000 mPa·s, slurries are likely to present difficulties in handling (for example, pumping and filtration of the slurry).

Moreover, an object of the present invention is to maintain the viscosity of the slurry, as measured by a Brookfield DVIII viscometer at 100 RPM after agitation, below 1,000 mPa·s over time, for example after a storage of 7 days, 20 days, or 1 month.

"Stable aqueous slurry" means an aqueous slurry that has a viscosity at 7 days, 20 days or 1 month which is less than 1,000 mPa·s as measured by a Brookfield DVIII viscometer at 100 RPM after agitation.

"Aqueous solution" preferentially means water according to the invention. This solution can possibly contain other liquids that are miscible with water or solids that are soluble in water.

"Powdered calcium hydroxide" means particles of slaked lime. Slaked lime is lime consisting of a collection of solid particles, mainly of calcium dihydroxide, Ca(OH)$_2$ which is the result of the reaction of quicklime particles with water, a reaction called hydration or quenching. Slaked lime is also called hydrated lime. In general, slaked lime can contain impurities which are mainly issues from quicklime, for example, magnesia, magnesium oxide, $Al_2O_3$, $Fe_2O_3$, MgO, S, $SiO_2$, $Mn_3O_4$, silicates etc. Slaked lime can occur in the powdery form or in the form of an aqueous slurry called milk-of-lime.

In the context of the present invention, slaked lime is dispersed as a powder in an aqueous solution in order to obtain a milk-of-lime that is concentrated and stable over time. For example, commercially available slaked lime in powder form is used as a starting mineral material. For example, slaked lime sold under the names Supercalco® 97, Supercalco® 97/20, Sorbacal® SP, Standard Hydrated Lime, MicroCal® HF are cited.

The particular (meth)acrylic copolymer according to the invention is a water-soluble comb type copolymer with a methacrylic acid and possibly an acrylic acid skeleton, and poly(alkyleneglycol) side chains.

"Poly(alkylene glycol)" means an alkylene glycol polymer derived from an olefinic oxide.

The poly(alkylene glycol) chains of the copolymer according to the present invention contain a proportion of oxyethylene groups and a proportion of oxypropylene groups.

The poly(alkylene glycol) chains according to the present invention may for example include a dominant proportion of the oxyethylene group in association with a secondary proportion of the oxypropylene group. Some specific examples of alkylene glycol polymers include: the poly (alkylene glycols) having an average molecular weight of 1,000, 4,000, 6,000, 10,000 and 20,000 g/mol; the polyethylene polypropylene glycols having an ethylene oxide percentage between 20 and 80% by weight, and a propylene oxide percentage between 20 and 80% by weight.

It should be noted that the oxyethylene and oxypropylene groups of the copolymer side chains can be arranged randomly, on a regular basis or in a block.

To be more precise, the polymer according to the present invention consists:
  of methacrylic acid monomers and/or any of its salts,
  possibly of acrylic acid monomers and/or any of its salts,
  monomers with the formula (I):

R—X—R'    (I)

according to which:
  R represents a polymerisable unsaturated group, notably acrylate, methacrylate, methacrylurethane, vinyl or allyl,
  R' represents hydrogen or an alkyl group with from 1 to 4 carbon atoms,
  X represents a structure with n unit(s) of ethylene oxide EO and m unit(s) of propylene oxide PO, arranged randomly or regularly,
  m and n are 2 non-zero integers and are between 1 and 150.

Thus, the copolymer according to the invention has a skeleton consisting of methacrylic acid monomers, and possibly acrylic acid monomers. Indeed, the inventors realized that the presence of methacrylic acid monomers in the skeleton of the copolymer according to the invention was indispensable in order to solve the technical problem at the origin of the present invention.

According to one method of embodiment of the invention, the copolymer has a skeleton consisting of methacrylic acid monomers exclusively.

According to another method of embodiment of the invention, the copolymer has a skeleton consisting of methacrylic acid monomers and acrylic acid monomers.

Thus, excluded from the context of the present invention is the use of a copolymer with a skeleton consisting exclusively of acrylic acid monomers.

The inventors also found that the use in the context of the present invention of the comb-type copolymer marketed under the name Ethacryl® G (polycarboxylate dispersant of the Coatex company, which does not contain methacrylic acid monomers) is not suitable for solving the technical problem at the origin of the present invention.

The said copolymer is obtained by known conventional radical copolymerization processes in solution, in bulk, in direct or inverse emulsion, in suspension or by precipitation in suitable solvents, in the presence of known catalytic systems and transfer agents, or again, by controlled radical polymerization processes such as the process known as reversible addition-fragmentation chain transfer (RAFT), the process known as atom transfer radical polymerization (ATRP), the process known as nitroxide-mediated polymerization (NMP), or again, the process known as cobalt-oxime mediated radical polymerization.

It is obtained in an acid and possibly distilled form. It can also be partially or totally neutralized by one or more neutralization agents chosen from among the hydroxides of sodium, calcium, magnesium and potassium and their mixtures, or chosen from the amines.

According to one method of embodiment of the present invention, the said copolymer is 100% neutralized with sodium hydroxide.

According to another method of embodiment of the present invention, the said copolymer is partially neutralized with sodium hydroxide.

According to steps a), b) and c) of the process according to the invention, there is respectively a specific volume of an aqueous solution, a specific quantity of powdered calcium hydroxide and a specific quantity of a copolymer as described above.

According to step d) of the process, at least part of the amount of the said copolymer is added under agitation to at least part of said aqueous solution.

In the present description, in general, "part", means a proportion of the total amount required, or alternatively, a proportion of the total volume required.

As an example, part of the aqueous solution can for example correspond to 40% of the total amount of water needed for the final dilution.

At the end of step d) of the process, a total aqueous solution or a primary aqueous solution is obtained.

"Total aqueous solution", means that the entire aqueous solution is subject to the following steps of the process.

"Primary aqueous solution" means that, as a first step, only a part of the aqueous solution is subject to shearing, the rest of the aqueous solution being implemented during the shearing and/or its terminal phase.

According to one method of embodiment, step d) of the process consists of adding under agitation at least one part of the amount of the said copolymer to the entire aqueous solution (total aqueous solution).

According to another method of embodiment, step d) of the process consists of adding under agitation the entire amount of the said copolymer to the entire aqueous solution (total aqueous solution).

According to still another method of embodiment, step d) of the process consists of adding under agitation a part of the necessary total quantity of the said copolymer to part of the total volume of the said aqueous solution (primary aqueous solution).

According to still another method of embodiment, step d) of the process consists of adding under agitation the entire necessary total quantity of the said copolymer to part of the total volume of the said aqueous solution (primary aqueous solution).

According to step e) of the process, at least part of the said quantity of the said calcium hydroxide is added under agitation to the aqueous solution of step d).

Thus, the total quantity of slaked lime can be added in a single step, or alternatively, in increments.

The slaked lime can also be introduced into the aqueous solution in a continuous manner, i.e. at a constant or variable speed, but without stopping the introduction.

According to one method of embodiment, all of the said quantity of the said calcium hydroxide is added under agitation to the aqueous solution of step d).

According to one method of embodiment, part of the said total required quantity of the said calcium hydroxide is added under agitation to the aqueous solution of step d). This method of embodiment has the advantage of increasing the flow of the apparatus by separating the addition of the lime into two steps: pre-dispersion and then final dispersion during shearing.

According to step f) of the process of the invention, a homogeneous shearing with a shear level greater than $50,000$ $s^{-1}$ is applied to the mixture resulting from step e).

The inventors demonstrate in fact that there is a critical homogeneous shear threshold required to achieve the objectives of the present invention, namely, elevated slaked lime content of the slurry, absence of sedimentation and stability of the slurry over time. Applying such a shear level to slaked lime slurries in combination with the use of a water-soluble copolymer with a particular chemical structure results in the achievement of these objectives. The rheological properties of the resulting dispersion are thus significantly optimized over time.

According to one method of embodiment, a homogeneous shearing with a shear level greater than $60,000$ $s^{-1}$, in particular greater than $70,000$ $s^{-1}$ is applied to the mixture resulting from step e).

According to the process of the present invention, a homogeneous shearing, which has the effect of applying the same minimum mechanical stresses to all parts of the aqueous slurry thus treated is applied to the said aqueous slurry.

The homogeneous shearing required according to the present invention can be obtained according to several variants.

According to a first variant, subjecting the mixture resulting from step e) to a constant shear rate can be envisaged.

However, the invention is not limited to this particular method of embodiment. For example, the shear rate can be separate, at a given time, for two points in the slurry. It is thus that by varying the geometry of the device used to generate the shear forces, it is possible to modulate the shear rate applied to the said to dispersion over time and/or in space.

The dispersion being fluid when it is subjected to shear, each part of it can thus be subjected to a shear rate which varies over time. The shearing is said to be homogeneous when, regardless of the variation of the shear rate over time, it passes through a minimum value that is the same for all parts of the dispersion at a given time that may differ from one location to another in the dispersion.

In the context of the present invention, the total aqueous slurry or the primary aqueous slurry is introduced into an appropriate device in order to generate a homogeneous shearing.

This device can have varied configurations. The exact configuration is not essential according to the invention, as long as on exiting this device, the entire dispersion has been subjected to the same minimum shear.

As an illustration, but one that is non-limiting, of the devices that can be used according to the invention to apply a homogeneous shearing, the IKA® Magic Lab and the Dispax Reactor® DR2000 mixers can in particular be cited.

According to one method of embodiment of the present invention, a rotor-stator type mixer is used for step f).

According an another method of embodiment, a mixer consisting of several rotor-stator couples in direct series is used for step f) of the process according to the invention.

According to one method of embodiment of the present invention, a mixer consisting of cylindrical parts which have a tangential speed greater than 40 m/sec. is used for step f).

A mixer of the rotor-stator type generally consists of two concentric disks creating a chamber in which the primary dispersion circulates. One of the disks is stationary (stator) and the other is driven with a uniform rotation around its axis (rotor). Such a device includes a product supply line (in the case in point, the lime slurry) which goes through the upper disc to discharge into the central part of the chamber. The slurry passes through the gap between the stator and the rotor. The rotor (the part of the device driven by a motor) and stator (the fixed part) are equipped respectively on their outer crowns with slots which allow the circulation of the slurry to be sheared. Such a device also includes an outlet pipe connected to a tank designed to receive the slurry thus sheared.

The shearing device can include a recirculation loop which allows a multiplication of the passes through the shearing device.

Thus, according to one method of embodiment, the device used to perform step 0 is equipped with a recirculating loop.

Process according to any of the preceding claims according to which a device configured to deliver a useful output of at least $1,000$ $W/m^3$ is used to carry out step f).

According to optional step g) of the process according to the invention, the residual quantity of the said copolymer and/or the said calcium hydroxide is added.

The said residual amount of the copolymer and/or the said residual quantity of the said calcium hydroxide may be added in the form of a dilution or slurry made with the residual part of the said aqueous solution (or at least a part of it).

This addition can, for example, be made in the course of step f), that is, during the shearing step. The said addition can be made continuously for the entire duration of step f), during part of it only, or in a single step, for example at the beginning of the shearing step, in the course of it, or at the end of it.

According to one method of embodiment of the present invention, the process of the invention does include the step consisting of the addition of an alkali metal hydroxide to the aqueous solution or slurry. It is possible to dispose of a copolymer according to the invention that is partially or totally neutralized by means of an alkali metal hydroxide. Nevertheless, according this method of embodiment, the addition of an alkali metal hydroxide as such to the aqueous solution or the aqueous slurry of lime is excluded.

According to one method of embodiment of the present invention, the process for the preparation of an aqueous slurry of calcium hydroxide with a dry content of at least 40% by weight, the viscosity of the said aqueous slurry measured by a Brookfield DVIII viscometer at 10 RPM being between 25 and 1,000 mPa·s at 20° C., includes the steps consisting of:

a) the availability of a specific volume of an aqueous solution, b) the availability of a measured quantity of powdered calcium hydroxide, c) the availability of a specified quantity of a copolymer consisting:

of methacrylic acid monomers and/or any of its salts, possibly of acrylic acid monomers and/or any of its salts, monomers with the formula (I):

$$R—X—R' \qquad (I)$$

according to which:

R represents a polymerisable unsaturated group, notably acrylate, methacrylate, methacrylurethane, vinyl or allyl, R' represents hydrogen or an alkyl group with from 1 to 4 carbon atoms, X represents a structure with n unit(s) of ethylene oxide EO and m unit(s) of propylene oxide PO, arranged randomly or regularly, m and n are 2 non-zero integers and are between 1 and 150, d) the entire amount of the said copolymer is added under agitation to the said aqueous solution, e) all of the said quantity of the said calcium hydroxide is added under agitation to the aqueous solution of step d), and f)) a homogeneous shear level greater than 50,000 s$^{-1}$ is applied to the mixture resulting from step e).

All the steps of the process of the invention can be carried out at room temperature, that is, at about 20° C., or at lower temperatures, for example, 10° C. Heating can be introduced from an external source. The introduction of slaked lime and/or the shearing of step e) are likely to lead to a more or less significant increase in the temperature of the slurry. If necessary, a device for cooling the slurry temperature can be provided.

According to one method of embodiment, the said specified quantity of copolymer varies between 0.01 and 10% by weight based on the total weight of calcium hydroxide particles in the slurry.

According to another method of embodiment, the said specified quantity of copolymer varies between 0.05 and 5% by weight based on the total weight of calcium hydroxide particles in the slurry.

According to still another method of embodiment, the said specified quantity of copolymer varies between 0.1 and 3.0% by weight based on the total weight of calcium hydroxide particles in the slurry.

According to another method of embodiment, the said specified quantity of copolymer varies between 0.2 and 2.0% by weight based on the total weight of calcium hydroxide particles in the slurry.

According to another method of embodiment, the aqueous slurry according to the present invention consists of water, particles of calcium hydroxide and a copolymer according to the present invention. According to this method of embodiment, the aqueous slurry contains no additive other than the copolymer described in the present application, that is, it does not contain another polymer or dispersant, for example.

According to one method of embodiment, the aqueous slurry is an aqueous slurry containing a dry particle content of calcium hydroxide of at least 40% by weight based on the total weight of the aqueous slurry.

According to another method of embodiment, the aqueous slurry according to the present invention has a calcium hydroxide particle content between 40% and 60% by weight based on the total weight of the aqueous slurry.

According to another method of embodiment, the aqueous slurry according to the present invention has a calcium hydroxide particle content between 45% and 55% by weight based on the total weight of the aqueous slurry.

According to one method of embodiment of the present invention, the said copolymer has a molecular mass between 30,000 and 200,000 g/mol as determined by Gel Permeation Chromatography (GPC).

According to another method of embodiment of the present invention, the copolymer has a molecular mass between 30,000 and 160,000 g/mol as determined by Gel Permeation Chromatography (GPC).

According to one method of embodiment of the present invention, in the said water-soluble copolymer, the said monomer of formula (I) is such that n and m are two non-zero integers, and n+m>17.

According to one method of embodiment of the present invention, in the said water-soluble copolymer, the R group of the said monomer of formula (I) represents the methacrylates group.

According to one method of embodiment of the present invention, in the said copolymer, the R' group of the said monomer of formula (I) represents H or CH$_3$.

According to one method of embodiment of the present invention, in the said copolymer, the said monomer of formula (I) consists of, expressed as a percentage by weight of each of its components:

5 to 30% by weight of methacrylic acid monomers and/or any of its salts, 0 to 10% by weight of acrylic acid monomers and/or any of its salts, 70 to 95% by weight of monomers of formula (I).

According to one method of embodiment of the present invention, in the said copolymer, the said monomer of formula (I) consists of, expressed as a percentage by weight of each of its components:

7 to 22% by weight of methacrylic acid monomers and/or any of its salts, 0 to 5% by weight of acrylic acid monomers and/or any of its salts, 78 to 93% by weight of monomers of formula (I).

The present invention also concerns an aqueous slurry of calcium hydroxide with a dry content of at least 40% by weight, the viscosity of the said aqueous slurry measured by a Brookfield DVIII viscometer at 10 RPM being between 25 and 1,000 mPa·s at 20° C., the said slurry likely to be obtained by the process of the present invention.

The present invention also concerns the use of the slaked lime aqueous slurry according to the invention in the applications that follow.

Slurries can be used in the treatment of smoke from energy-producing plants that use combustibles (including coal) containing sulphur and other impurities, for example, that generate acid molecules (sulphur dioxide, sulphur trioxide, sulphuric acid, hydrochloric acid, hydrofluoric acid, etc.) or pollutants (mercury, heavy metals, etc.).

They can also be used in household or industrial waste incineration plants which generate the same type of pollutants, with dioxins as well.

The use of lime in a concentrated aqueous slurry, sprayed into the smoke, traps the pollutants which are then eliminated in the solid residues produced by the reaction with lime, and the partial or total drying of the reaction products.

Slurries can be used as acid reaction product neutralizing agents, allowing their removal in the solid and/or neutralized form, or their use in the form of calcium salt (such as for example sulfonates and phenates neutralized as additives of lubricating products). In a non-limiting manner, the neutralization of acid sludges from the manufacture of titanium dioxide, the neutralization of acidic solutions produced during chemical manufacturing processes, can be cited.

The aqueous slurries of the present invention can be used as mine effluent neutralizers for the purpose of neutralizing acidity and/or separating heavy metals in solution prior to the discharge of fluids into the natural environment or into a lagoon.

Slurries can be used in water decarbonation processes, a process for temporarily reducing water hardness (partial or total elimination of alkaline earth metal bicarbonates). The water thus treated is intended to be used as drinking water or industrial water, possibly after a readjustment of the pH using carbon dioxide or any other acid suitable for the final application.

Drinking water, wastewater or industrial water purification treatments generate residues called sludges. These sludges are first separated from the purified water and then processed in order to stabilize and concentrate them. The sludge treatment process is usually called conditioning and uses organic and/or mineral additives.

The present invention also concerns the use of the slaked lime aqueous slurry according to the invention to condition sludges from wastewater treatment plants. Slurried lime is used as a first step to promote the flocculation of sludges, and in a second step for pH sterilization of the said sludges by maintenance of their pH at 12 or higher for 24 to 72 hours or more.

Slurries can be used in the treatment of aggregates used in the bituminous coated material production process. The adhesion of bitumen emulsions to aggregates is greatly improved when these aggregates are treated with lime beforehand. This better adhesion results in bituminous coatings that are more wear and deformation-resistant and have an extended physical integrity.

The aqueous slurries of the present invention can be used in the production of aerated concrete type construction materials. Lime is mixed with cement, sand and aluminium powder. The elevated pH of the mixture causes a gaseous release of hydrogen by an attack of the aluminium, and the resulting aerated paste produced is moulded and then autoclaved to produce aerated concrete parts.

The aqueous slurries of the present invention can be used in the treatment of contaminated soils in order to neutralize the acidity of these soils, to immobilize pollutants by neutralization or flocculation, and thus avoid the driving of such pollutants into the groundwater.

The aqueous slurries of the present invention can be used in the treatment of soils in agriculture in order to correct the pH of these soils, improve the said soils by providing a source of calcium or of calcium and magnesium in the case of dolomitic lime, and make these soils less impermeable by flocculation of clays they contain.

The aqueous slurries of the present invention can be used in the treatment of surface waters, lakes, ponds and rivers in order to adjust the pH of the water to reduce the impact of the acidification of these waters, acidification of rain or animal origin in the case of fish farming.

The aqueous slurries of the present invention can be used in the production of food for livestock or poultry, and among others, as a source of calcium or calcium and magnesium.

The aqueous slurries of the present invention can be used in the paper industry, for example, as a constituent of papermaking pulp.

In addition, they can be used for the refining of sugar.

They can also be used for the production of precipitated calcium carbonate (PCC).

The present invention also concerns the use of slaked lime aqueous slurry according to the invention for the treatment of industrial smoke, including the desulfurization of smoke, or for the treatment of domestic wastewater, including drinking, or industrial wastewater.

The present invention also concerns a process for the treatment of gases or smoke, including a step consisting of injecting/spraying an aqueous slurry of slaked lime according to the invention into the gases or smoke to be treated in order to remove acidic compounds, oxides of sulphur, hydrochloric acid, etc.

EXAMPLES

In all the tests that follow, the slurries are evaluated using the parameters described below.

The viscosity (expressed in mPa·S) of each slurry is measured at 20° C. with a Brookfield DVIII type viscometer. The indicated viscosity values are measured before agitation or after agitation at a speed of 10 RPM and 100 RPM, and at different storage times. The viscosity values after 1 month of storage and after agitation of the slurry (using equipment of the Rayneri type, for example) are all particularly relevant in assessing the characteristics of the invention (influence of the polymer, influence of the equipment, influence of the minimum degree of shearing) with regard to the use of the slurries in industrial processes.

The sedimentation of each slurry is evaluated by a measurement of the height of the deposit in the container. The sedimentation values are expressed in %, that is, the height of the deposit compared to the total height of the slurry in the container, multiplied by 100.

Example 1

This example illustrates the use of different polymers (prior art, invention, outside of the invention) in a process for the preparation of an aqueous slurry of calcium hydroxide (slaked lime) according to the invention.

Several aqueous slurries of calcium hydroxide, each having a 48±1% solids content, are prepared in this example. 503 g of water are introduced into a container together with a quantity of a polymer corresponding to 1.41% by dry weight (on the basis of the total weight of the solids in the slurry), the said polymer being a polymer of the prior art or a polymer of the present invention. Then, 485 g of slaked lime (Supercalco® 97, Carmeuse) are introduced into the container under agitation.

A mixer of the IKA® Magic Lab type, adjusted to produce a shearing of 82,000 $s^{-1}$ is then supplied with the mixture obtained in the previous step. A recirculating loop allows several passages through the gap formed by the rotor and the stator of the IKA mixer. Once it is sheared, the slurry is stored for an evaluation of its parameters of viscosities, sedimentation and stability at 1 month.

The polymers used in example 1 have the following characteristics:

Test 1-1:

This test demonstrates the use, in a process according to the invention, of a homopolymer outside of the invention available commercially under the name Rheosperse® 3010, Coatex, France, and composed of acrylic acid monomers, 100% neutralized with sodium hydroxide (molecular weight): 4,000 g/mol.

Test 1-2:

This test demonstrates the use, in a process according to the invention, of a copolymer outside of the invention commercially available and consisting of acrylic acid monomers and of vinyl-PEG$_{2000}$ structured macromonomers, i.e., of monomers having 46 units of ethylene oxide.

Thus, this comb-structured polymer does not, on the one hand, have methacrylic acid monomers, and on the other, propylene oxide units on its macromonomers.

Test 1-3:

This test demonstrates the use, in a process according to the invention, of a commercially available copolymer outside of the invention consisting of 15% by weight of acrylic acid monomers and methacrylic acid monomers, as well as 85% by weight of MPEG$_{5000}$ macromonomers (i.e. methoxy (EO)$_{113}$ units).

Thus, this comb structured polymer does not have propylene oxide units on its macromonomers.

Tests 1-4 to 1-8: Copolymers with a Particular Structure, According to the Invention or Outside of the Invention.

These tests demonstrate the use of water-soluble copolymers according to the invention or outside of the invention, having:

a negatively charged skeleton consisting of randomly polymerized acrylic acid and/or methacrylic acid monomers, and uncharged side chains consisting of poly(alkylene glycol) units.

Test 1-4: Outside of the Invention

The copolymer has the following composition (in % by weight relative to the total weight of the copolymer):

12.8% acrylic acid monomers, 87.2% monomers of formula (I): R—X—R in which R represents a methacrylate group, R designates hydrogen, X represents a structure with 46 units of ethylene oxide EO and 15 units of propylene oxide PO, arranged randomly.

Molecular weight: 38,000-52,000 g/mol.

Partial NaOH neutralization; pH: 3-4.5.

This copolymer, not having methacrylic acid monomers, is a copolymer outside of the invention.

Test 1-5: According to the Invention

The copolymer has the following composition (in % by weight relative to the total weight of the copolymer):

7.44% methacrylic acid monomers, 92.56% monomers of formula (I): R—X—R' in which R represents a methacrylate group, R' designates hydrogen, X represents a structure with 46 units of ethylene oxide EO and 15 units of propylene oxide PO, arranged randomly.

Molecular weight: 110,000-150,000 g/mol.

Partial NaOH neutralization; pH: 3-4.5.

Test 1-6: According to the Invention

The copolymer has the following composition (in % by weight relative to the total weight of the copolymer):

19.8% methacrylic acid monomers,

3% acrylic acid monomers, and 77.2% monomers of formula (I): R—X—R' in which R represents a methacrylate group, R' designates hydrogen, X represents a structure with 46 units of ethylene oxide EO and 15 units of propylene oxide PO, arranged randomly.

Molecular weight: 34,000-44,000 g/mol.

Total NaOH neutralization; pH: 7.7.

Test 1-7: According to the Invention

The copolymer has the following composition (in % by weight relative to the total weight of the copolymer):

12.5% methacrylic acid monomers, 87.5% monomers of formula (I): R—X—R' in which R represents a methacrylate group, R' designates hydrogen, X represents a structure with 46 units of ethylene oxide EO and 15 units of propylene oxide PO, arranged randomly.

Molecular weight: 60,000-95,000 g/mol.

Total NaOH neutralization; pH: 6.7-7.7.

Test 1-8: Outside of the Invention

The copolymer has the following composition (in % by weight relative to the total weight of the copolymer):

24% methacrylic acid monomers, 4.3% acrylic acid monomers, and 71.7% monomers of formula (I): R—X—R' in which R represents a methacrylate group, R' designates H, X represents a structure with 46 units of ethylene oxide EO.

Neutralization: 100% NaOH.

Molecular weight: 17,900 g/mol.

This copolymer, whose monomers of formula (I) do not have propylene oxide units, is a copolymer outside of the invention.

The results of sedimentation and of the different measurements of viscosity are presented in table 1 below:

TABLE 1

| Tests | | sedimentation T0 | viscosity aftag T0 10 RPM | viscosity aftag T0 100 RPM | viscosity befag T0 + 1 m 10 RPM | viscosity befag T0 + 1 m 100 RPM | viscosity aftag T0 + 1 m 10 RPM | viscosity aftag T0 + 1 m 100 RPM |
|---|---|---|---|---|---|---|---|---|
| 1-1 | PA | 15% | 10 | 58 | 1000 | 124 | 2770 | 382 |
| 1-2 | PA | 0 | 9840 | 1140 | 21000 | 4550 | 11020 | 1146 |
| 1-3 | PA | 0 | 1940 | 386 | 17800 | 3820 | 7220 | 1000 |
| 1-4 | CH | 0 | 290 | 170 | 19000 | 3310 | 16460 | 1900 |
| 1-5 | INV | 0 | 300 | 159 | 4620 | 890 | 590 | 230 |
| 1-6 | INV | 0 | 250 | 152 | 1320 | 478 | 730 | 234 |
| 1-7 | INV | 0 | 170 | 114 | 1260 | 462 | 330 | 170 |
| 1-8 | OI | 30% | 30 | 40 | 1900 | 802 | 470 | 202 |

PA: prior art
OI: outside of the invention
INV: Invention
aftag: after agitation
befag: before agitation Firstly, one can observe that the polymers of tests 1-1 (homopolymers of acrylic acid) and 1-8 (copolymers with no propylene oxide in their side chains) do not avoid sedimentation. The use of these polymers therefore does not solve the technical problem at the origin of the present invention.

The measurement of viscosity at 10 RPM after agitation and at T0 shows that the polymers of tests 1-2 and 1-3 do create slaked lime slurries with rheological characteristics enabling their uses in industrial processes, in particular the rheological characteristics specific to the pumping of the slurries. The slurry obtained in test 1-2 using a polymer of the prior art in fact has a viscosity of 9,840 mPa·s at T0 after agitation. The slurry obtained in test 1-3 using another polymer of the prior art has a viscosity of 1,940 mPa·s at T0 after agitation. These values, outside the range of viscosities claimed (between 25 and 1,000 mPa·s at 20° C.) are incompatible with the use of expected slurries.

The measurement of viscosity at 10 RPM after agitation at T0+1 month shows that the polymer of test 1-4 does not produce a concentrated lime slurry that has a suitable viscosity. In fact, this viscosity rises to 16,460 s$^{-1}$.

The rheological profiles of the lime slurries of tests 1-5, 1-6 and 1-7 (use of a copolymer according to the invention) are suitable for the use of slurries in industrial processes.

Example 2

This example demonstrates the use of shearing equipment, identical or different, possibly adjusted to different shear levels to prepare an aqueous slurry of calcium hydroxide (slaked lime) containing a copolymer according to the invention.

A first series of three aqueous slurries of calcium hydroxide (tests 2-1 to 2-3), each one having a 48±1% solids content, is prepared by the introduction into a container of 503 g of water and of a quantity of a polymer which corresponds to 1.41% by dry weight (on the basis of the total weight of the solids in the slurry). The said copolymer is the one of test 1-5. Then, 485 g of slaked lime (Supercalco® 97, Carmeuse) are introduced into the container under agitation.

A second series of three aqueous slurries of calcium hydroxide (tests 2-4 to 2-6), each one having a 48±1% solids content, are prepared by the introduction into a container of 503 g of water and a quantity corresponding to 1.41% by dry weight of a polymer (on the basis of the total weight of the solids in the slurry), the said polymer being that of test 1-6. Then, 485 g of slaked lime (Supercalco® 97, Carmeuse) are introduced into the container under agitation.

Tests 2-1 and 2-4

A mixer of the Ultraturax® type (rotor-stator type) adjusted to produce a shear of about 40,000 s$^{-1}$, and which produces a homogeneous shearing according to the definition of the present invention, is supplied with the mixture obtained in the previous step.

A recirculation loop allows several passes through the mixer. The recirculation time is set to 15 minutes.

Tests 2-2 and 2-5

A mixer of the Rayneri® type, adjusted to produce a shear of about 3,000 s$^{-1}$, (which does not produce a homogeneous shearing according to the definition of the present invention), is supplied with the mixture obtained in the previous step.

A recirculation loop allows several passes through the mixer. The recirculation time is set to 15 minutes.

Tests 2-3 and 2-6

A mixer of the IKA® Magic Lab type, adjusted to produce a shear of about 82,000 s$^{-1}$, and which produces a homogeneous shearing according to the definition of the present invention, is then supplied with the mixture obtained in the previous step.

A recirculating loop allows several passages through the gap formed by the rotor and the stator of the IKA mixer. The recirculation time is set to 15 minutes.

Once they are sheared, the slurries are stored for an evaluation of the parameters of viscosities, sedimentation and stability at 1 month.

The results of sedimentation and of the different measurements of viscosity are presented in table 2 below:

TABLE 2

| Tests | | sedimentation T0 | viscosity Aftag T0 10 RPM | viscosity Aftag T0 100 RPM | viscosity befag T0 + 1 m 10 RPM | viscosity befag T0 + 1 m 100 RPM | viscosity aftag T0 + 1 m 10 RPM | viscosity aftag T0 + 1 m 100 RPM |
|---|---|---|---|---|---|---|---|---|
| 2-1 | OI | 30% | 70 | 107 | 3300 | 560 | 430 | 168 |
| 2-2 | OI | 20% | 50 | 98 | 2400 | 236 | 790 | 220 |
| 24 | INV | 0 | 300 | 159 | 4620 | 890 | 590 | 230 |
| 24 | OI | 30% | 650 | 162 | 1600 | 580 | 1890 | 380 |
| 2-5 | OI | 30% | 260 | 107 | 19300 | 1800 | 1000 | 240 |
| 2-6 | INV | 0 | 250 | 152 | 1320 | 478 | 730 | 234 |

OI: outside of the invention
INV: Invention
Aftag: after agitation
befag: before agitation It is immediately apparent that the shear level used in tests 2-1 and 2-4 (Ultraturax adjusted to 40,000 s$^{-1}$) and tests 2-2 and 2-5 (3,000 s$^{-1}$ mixer) do not avoid sedimentation.

On the other hand, the shear level of tests 2-3 and 2-6 (IKA adjusted to 82,000 s$^{-1}$), combined with the use of a polymer with a particular structure, not only avoids the problem of sedimentation, but in addition, enables the production of slurries whose rheological profile is adapted to the expected use.

Example 3

This example illustrates the use of two polymers according to the invention in a process for the preparation of an aqueous slurry of calcium hydroxide (slaked lime) with a high dry extract content (>50% by weight).

Two aqueous slurries of calcium hydroxide, each having a 50 to 51% solids content, are prepared in this example. 478 g of water are introduced into a container together with a quantity of a polymer corresponding to 1.41% by dry weight, on the basis of the total weight of the solids in the slurry. Then, 505 g of slaked lime (Supercalco® 97, Carmeuse) are introduced into the container under agitation.

A mixer of the IKA® Magic Lab type, adjusted to produce a shearing of 82,000 s$^{-1}$ is then supplied with the mixture obtained in the previous step. A recirculating loop allows several passages through the gap formed by the rotor and the stator of the IKA mixer. Once it is sheared, the slurry is stored for an evaluation of its parameters of viscosity, sedimentation and stability at 1 month.

The polymers used in this example have the following characteristics:

Test 3-1: According to the Invention

The copolymer has the following composition (in % by weight relative to the total weight of the copolymer):
  7.44% methacrylic acid monomers,
  92.56% monomers of formula (I): R—X—R' in which R represents a methacrylate group, R' designates hydrogen, X represents a structure with 46 units of ethylene oxide EO and 15 units of propylene oxide PO, arranged randomly.
  Molecular weight: 110,000-150,000 g/mol.
  Partial NaOH neutralization; pH: 3-4.5.

Test 3-2: According to the Invention

The copolymer has the following composition (in % by weight relative to the total weight of the copolymer):
  19.8% methacrylic acid monomers,
  3% acrylic acid monomers, and
  77.2% monomers of formula (I): R—X—R' in which R represents a methacrylate group, R' designates hydrogen, X represents a structure with 46 units of ethylene oxide EO and 15 units of propylene oxide PO, arranged randomly.
  Molecular weight: 34,000-44,000 g/mol.
  Total NaOH neutralization; pH: 7.7.

The results of sedimentation and of the different measurements of viscosity are presented in table 3 below:

TABLE 3

| Tests | sedimentation T0 | viscosity aftag T0 10 RPM | viscosity aftag T0 100 RPM | viscosity befag T0 + 1 m 10 RPM | viscosity befag T0 + 1 m 100 RPM | viscosity aftag T0 + 1 m 10 RPM | viscosity aftag T0 + 1 m 100 RPM |
|---|---|---|---|---|---|---|---|
| 3-1 50.4% lime | 0% | 980 | 393 | 4900 | 1980 | 1930 | 687 |
| 3-2 50.56% lime | 0% | 530 | 261 | 13600 | 3048 | 3300 | 839 | aftag: after agitation
befag: before agitation

The results demonstrate that it is possible, according to the process of the present invention, and using water-soluble copolymers with a particular structure, to prepare high concentration slaked lime slurries that remain stable over time.

Example 4

This example demonstrates the use of two polymers according to the invention in a process for the preparation of an aqueous slurry of calcium hydroxide starting with two different types of slaked lime, namely, a lime with an average particle diameter between 4 and 5 µm (Supercalco® 97, Carmeuse), and a lime with an average particle diameter between 2 and 3 µm (Supercalco® 97/20, Carmeuse).

Several aqueous slurries of calcium hydroxide, each having a 48±1% solids content, are prepared in this example. 503 g of water are introduced into a container together with a quantity of a polymer corresponding to 1.41% by dry weight (on the basis of the total weight of the solids in the slurry). Then, 485 g of slaked lime, specifically, Supercalco® 97 (Carmeuse) in tests 4-1 and 4-3, or Supercalco® 97/20 (Carmeuse) in tests 4-2 and 4-4, are introduced into the container under agitation.

A mixer of the IKA® Magic Lab type, adjusted to produce a shearing of 82,000 s$^{-1}$ is then supplied with the mixture obtained in the previous step.

A recirculating loop allows several passages through the gap formed by the rotor and the stator of the IKA mixer.

Once it is sheared, the slurry is stored for an evaluation of its parameters of viscosities, sedimentation and stability at 1 month.

The polymers used in this example have the following characteristics:

Tests 4-1 and 4-2: According to the Invention

The copolymer has the following composition (in % by weight relative to the total weight of the copolymer):
  7.44% methacrylic acid monomers,
  92.56% monomers of formula (I): R—X—R' in which R represents a methacrylate group, R' designates hydrogen, X represents a structure with 46 units of ethylene oxide EO and 15 units of propylene oxide PO, arranged randomly.
  Molecular weight: 110,000-150,000 g/mol.
  Partial NaOH neutralization; pH: 3-4.5.

Tests 4-3 and 4-4: According to the Invention

The copolymer has the following composition (in % by weight relative to the total weight of the copolymer):
  19.8% methacrylic acid monomers,
  3% acrylic acid monomers, and
  77.2% monomers of formula (I): R—X—R' in which R represents a methacrylate group, R' designates hydrogen, X represents a structure with 46 units of ethylene oxide EO and 15 units of propylene oxide PO, arranged randomly.
  Molecular weight: 34,000-44,000 g/mol.
  Total NaOH neutralization; pH: 7.7.

The results of sedimentation and of the different measurements of viscosity are presented in table 4 below:

TABLE 4

| Tests | | Sedimentation T0 | Viscosity AFTAG 10 RPM | Viscosity AFTAG T0 100 RPM |
|---|---|---|---|---|
| 4-1 | INV | 0% | 300 | 159 |
| 4-2 | INV | 0% | 280 | 203 |
| 4-3 | INV | 0 | 250 | 152 |
| 4-4 | INV | 0% | 190 | 126 |

AFTAG: after agitation
BEFAG: before agitation

The results demonstrate that it is possible, according to the process of the present invention, by using water-soluble copolymers with a particular structure, to prepare high concentration slaked lime slurries that remain stable over time, regardless of the starting particle size distribution of the slaked lime.

Example 5

The purpose of this example is to illustrate the levels of total organic carbon (TOC) present in the aqueous phase of lime slurries dispersed with the polymers of the prior art or with the polymers of the invention, and thus determine the concentrations of free polymers in the aqueous phase.

This example helps to illustrate the levels of soluble $Ca^{2+}$ ions present in the aqueous phase of lime slurries dispersed with polymers of the prior art or with polymers of the invention.

Process for the Preparation of Slurries

Several aqueous slurries of calcium hydroxide, each having a 48±1% solids content, are prepared in this example. 503 g of water are introduced into a container together with a quantity of a polymer corresponding to 1.41% by dry weight (on the basis of the total weight of the solids in the slurry), the said polymer being according to the prior art or according to the present invention. Then, 485 g of slaked lime (Supercalco® 97, Carmeuse) are introduced into the container under agitation.

A mixer of the IKA® Magic Lab type, adjusted to produce a shearing of 82,000 s$^{-1}$ is then supplied with the mixture obtained in the previous step. A recirculating loop allows several passages through the gap formed by the rotor and the stator of the IKA mixer.

Test 5-1

The copolymer has the following composition (in % by weight relative to the total weight of the copolymer):
7.44% methacrylic acid monomers,
92.56% monomers of formula (I): R—X—R' in which R represents a methacrylate group, R' designates hydrogen, X represents a structure with 46 units of ethylene oxide EO and 15 units of propylene oxide PO, arranged randomly.
Molecular weight: 110,000-150,000 g/mol.
Partial NaOH neutralization; pH: 3-4.5.

Test 5-2

The copolymer has the following composition (in % by weight relative to the total weight of the copolymer):
12.8% acrylic acid monomers,
87.2% monomers of formula (I): R—X—R' in which R represents a methacrylate group, R' designates hydrogen, X represents a structure with 46 units of ethylene oxide EO and 15 units of propylene oxide PO, arranged randomly.
Molecular weight: 38,000-52,000 g/mol.
Partial NaOH neutralization; pH: 3-4.5.

This copolymer, not having methacrylic acid monomers, is a copolymer outside of the invention.

Test 5-3

The polymer used is a homopolymer outside of the invention available commercially under the name Rheosperse® 3010, Coatex, France, and composed of acrylic acid monomers, 100% neutralized with sodium hydroxide (molecular weight: 4,000 g/mol).

The slurries obtained are filtered.

A sample of the filtrate is taken and analysed according to the methods described below.

Measurement of TOC:

The TOC (Total Organic Carbon) is measured using a Shimadzu TOC-V CSH by means of a method based on a catalytic oxidation by combustion method at 680° C.

The carbon atoms of the samples are oxidized into $CO_2$. The gas eluent pushes the $CO_2$ into a system that enables the removal of $H_2O$ molecules and halogenated compounds. An IR detector measures the $CO_2$ concentration. A calibration curve is used to determine the carbon concentration in the sample.

Assay of Ions:

The ion content is evaluated by means of ion chromatography using Metrohm 761 Compact IC type equipment. Separation of ions and polar molecules is based on their charge.

The results of TOC and free $Ca^{2+}$ ion concentration measurements are given in table 5 below:

TABLE 5

| Tests | | Ca2+ ppm | TOC ppm | polymer concentration ppm |
|---|---|---|---|---|
| 5-1 | INV | 1064 | 1640 | 396 |
| 5-2 | OI | 995 | 3900 | 856 |
| 5-3 | PA | 291 | 100 | 17 |

It is observed firstly that the levels of free $Ca^{2+}$ ions vary significantly depending on the nature of the polymer used. This free $Ca^{2+}$ ion content in a lime slurry dispersed with an acrylic acid homopolymer (test 5-3) is low compared to that of an aqueous slurry of lime dispersed with a copolymer with a (meth)acrylic acid skeleton and poly(alkyleneglycol) side chains (tests 5-1 and 5-2).

In addition, although the starting quantities of polymer (1.41% by dry weight) are identical for each of the slurries, it is noted that the concentrations of polymer in the filtrate of each slurry vary significantly depending on the polymer used. When the polymer used is an acrylic acid homopolymer, the concentration of soluble polymer in the aqueous phase is almost zero. In addition, there is less free copolymer in the lime slurry filtrate when using a copolymer according to the invention. Without being bound to any theory, one can think that the particular structure of the copolymer according to the invention is adapted to the chemical nature of lime, which improves the chemical interactions between the copolymer and the particles of $Ca(OH)_2$. There is less free copolymer in the lime slurries prepared according to the process of the invention by using a copolymer with a particular structure, because a greater quantity of it is adsorbed on the surface of the slaked lime particles. It is thus shown that submitting a concentrated aqueous lime slurry to a shearing operation under specific conditions in the presence of a copolymer according to the invention produces a concentrated, stable lime slurry which is novel compared to lime slurries of the prior art by virtue of the specific chemical interactions between the copolymers and lime particles.

Embodiment 1

Process for the preparation of an aqueous slurry of calcium hydroxide with a dry content of at least 40% by weight, the viscosity of the said aqueous slurry measured by a Brookfield DVIII viscometer at 10 RPM being between 25 and 1,000 mPa·s at 20° C., including the steps consisting of:
a) the availability of a specific volume of an aqueous solution,
b) the availability of a measured quantity of powdered calcium hydroxide,
c) the availability of a specified quantity of a copolymer consisting:
of methacrylic acid monomers and/or any of its salts,
possibly of acrylic acid monomers and/or any of its salts,
monomers with the formula (I):

according to which:
R represents a polymerisable unsaturated group, notably acrylate, methacrylate, methacrylurethane, vinyl or allyl,
R' represents hydrogen or an alkyl group with from 1 to 4 carbon atoms,
X represents a structure with n unit(s) of ethylene oxide EO and m unit(s) of propylene oxide PO, arranged randomly or regularly,
m and n are 2 non-zero integers and are between 1 and 150,
d) to at least a part of said aqueous solution, at least a part of the quantity of the said copolymer is added under agitation,
e) to the aqueous solution of step d), at least a part of the said quantity of the said calcium hydroxide is added under agitation,
f) a homogeneous shear level greater than 50,000 $s^{-1}$ is applied to the mixture resulting from step e),
g) possibly, in the course of step 0, the remaining quantity of the said copolymer and/or of the said calcium hydroxide is added.

Embodiment 2

Process according to Embodiment 1, according to which the copolymer has a molecular mass between 30,000 and 200,000 g/mol as determined by Gel Permeation Chromatography (GPC).

Embodiment 3

Process according to any of the preceding Embodiments, according to which the said monomer of formula (I) is such that n and m are two non-zero integers, and n+m>17.

Embodiment 4

Process according to any of the preceding Embodiments, according to which the R group of the said monomer of formula (I) represents the methacrylate group.

Embodiment 5

Process according to any of the preceding Embodiments, according to which the R group of the said monomer of formula (I) represents H or $CH_3$.

Embodiment 6

Process according to any of the preceding Embodiments, according to which the said monomer of formula (I) consists of, expressed as a percentage by weight of each of its components:
5 to 30% by weight of methacrylic acid monomers and/or any of its salts,
0 to 10% by weight of acrylic acid monomers and/or any of its salts,
70 to 95% by weight of monomers of formula (I).

Embodiment 7

Process according to any of the preceding Embodiments, according to which a mixer of the rotor-stator type is used for step f).

Embodiment 8

Process according to any of the preceding Embodiments, according to which the device used to perform the step 1) is equipped with a recirculating loop.

Embodiment 9

Process according to any of the preceding Embodiments, according to which a device configured to deliver a useful output of at least 1,000 W/$m^3$ is used to carry out step f).

Embodiment 10

Aqueous slurry of calcium hydroxide with a dry content of at least 40% by weight, the viscosity of the said aqueous slurry measured by a Brookfield DVIII viscometer at 10 RPM being between 25 and 1,000 mPa·s at 20° C., the said slurry being likely to be obtained by the process according to any of claims 1 to 9.

Embodiment 11

Use of a slaked lime aqueous slurry according to Embodiment 10 for the treatment of industrial smoke, including for the desulfurization of smoke, or for the treatment of domestic wastewater, including drinking, or industrial wastewater.
Use of a hydrosoluble copolymer to produce an aqueous suspension of lime.
The present invention as further described hereinbelow also relates to the technical field of the preparation of aqueous suspensions of calcium hydroxide. More specifically, the present invention relates to the use of a hydrosoluble copolymer to prepare a lime-based suspension, as well as aqueous suspensions of lime comprising such a polymer. Such suspensions are in particular used as a chemical neutralizing agent in industrial or household methods.
Calcium hydroxide $Ca(OH)_2$, also called slaked lime or hydrated lime, is obtained by hydrating calcium oxide CaO, also called quicklime, according to the following exothermic reaction: $CaO + H_2O \rightarrow Ca(OH)_2$.

In the context of the present invention as further described hereinbelow, the terms "calcium hydroxide" or "calcium dihydroxide" are used equivalently to designate particles of $Ca(OH)_2$.

Calcium hydroxide-based products assume various forms: powdered (dry, powdery form), plastic pastes, or aqueous suspensions-dispersions (milk of lime).

The invention as further described hereinbelow more particularly relates to a calcium hydroxide-based product found in the form of an aqueous suspension. Such aqueous slaked lime suspensions may be used as chemical neutralizing agents in many industrial methods. Examples include industrial effluent treatment, for example gaseous effluents such as acid fumes. Examples also include the treatment of potable water, wastewater or industrial water.

Aqueous suspensions of slaked lime are in particular characterized by their dry matter content (wt %). One skilled in the art traditionally seeks to increase the dry matter content in aqueous solutions of slaked lime, primarily for economic reasons: by increasing the dry matter content of the aqueous suspensions of slaked lime, transport and handling costs are reduced per ton of product. Furthermore, the annoyances due to the manipulation of powders (hygiene, handling) are reduced and implementation is made easier.

To increase the dry matter content of aqueous suspensions of slaked lime, it is in particular possible to use a dispersing agent.

"Dispersing agent" refers to an agent that has the ability to improve the dispersion state of the particles of $Ca(OH)_2$ within the aqueous suspension. Concretely, when these agents are used in aqueous suspensions of a mineral material, they cause a decrease in viscosity. Thus, an aqueous suspension of a mineral material including a dispersing agent will have a viscosity lower than that of the same aqueous suspension of mineral material not containing said dispersing agent.

A certain number of prior art documents describe the use of dispersing agents. Document EP 0,061,354 (Blue Circle) describes the use of anionic oligomeric polyelectrolytes, for example methacrylic acid homopolymers, carboxymethyl-cellulose or sulfonate, to manufacture aqueous dispersions of slaked lime.

Document FR 2,677,351 (Italcementi) describes a concentrated aqueous suspension of calcium hydrate, which contains at least 40% solid hydrated lime obtained from powdered hydrated lime, slaked lime or quicklime, and a hydrosoluble polymer that may be an alkali or alkaline-earth metal polyacrylate.

Document EP 0,594,332 (Rohm & Haas) describes the use of polymeric anionic dispersing agents to obtain dispersions of aqueous quicklime or slaked lime. These dispersing agents are chosen from among homopolymers, copolymers and terpolymers having carboxylic acid, sulfonic acid or phosphoric acid functionalities. The monomers that impart such an acid functionality for example include acrylic acid, methacrylic acid, crotonic acid, maleic acid, maleic anhydride, itaconic acid, mesaconic acid, fumaric acid, citraconic acid, vinylacetic acid, acryloxypropionic acid, vinylsulfonic acid, styrenesulfonic acid, 2-acrylamido-2-methylpropane-sulfonic acid, allyl sulfonic acid, allyl phosphonic acid, vinylphosphonic acid, and vinylsulfonic acid.

Document US 2008/0011201 (Ultimate Nominees) describes the combined use of a polycarboxylate dispersant and a carbohydrate dispersant to prepare a milk of lime for applications in the food and potable water field. In particular, according to this document, the carbohydrate dispersant is a sugar, in particular chosen from among aldoses, saccharides, disaccharides and polysaccharides. Also, examples of a polycarboxylate dispersant are in particular the salts of maleic styrene anhydride copolymers or polycarboxylate polyether salts. This document in particular describes the combined use of a comb-type copolymer, in particular Ethacryl® G (polycarboxylate dispersant by the company Coatex) and a glucose syrup (carbohydrate dispersant) to prepare a 50% hydrated lime suspension/dispersion.

Document EP 0,848,647 (Chemical L Company) describes the use of a dispersing agent of the anionic polyelectrolyte type, combined with an alkali metal hydroxide, to prepare a lime suspension that may be quicklime or slaked lime. The anionic polyelectrolyte is chosen from among polyacrylic acid, polycarboxylic acid, and polyphosphoric acid, the copolymers of polyacrylic acid, polycarboxylic acid and polyphosphoric acid and their alkali metal salts.

Document FR 6,687,396 (Lhoist) describes a method for slaking CaO or magnesium oxide in the presence of $SO_3^-$, $SO_4^{2-}$ or $Cl^-$ ions and in that during or at the end of the reaction, a polymer or copolymer is added comprising monomers chosen from among acrylic acid and its salts, methacrylic acid and its salts, vinylbenzyl sulfonic acid and its salts, acrylamido-2-methylpropanesulfonic acid and its salts, 2-sulfoethyl methacrylate and its salts.

Document JP 09 122471 (Nippon Shokubai) describes the use of copolymers made up of a carboxylic monomer and a monomer of the polyalkylene glycol methacrylate type as dispersing agent making it possible to obtain aqueous dispersions of slaked lime with a low viscosity. This document illustrates the use, to that end, of copolymers having a molecular weight of less than 20,000 g/mol.

Document WO 2010/106111 (Lhoist) relates to compositions comprising slaked lime and/or quicklime and an organic polymer incorporated into the solid phase of the slaked lime. The polymers described in this document may be non-ionic, anionic, cationic or amphoteric and of quite varied natures. They may be obtained from monomers chosen from among anionic monomers having a carboxylic function or a sulfonic acid function, non-ionic monomers (acrylamide, methacrylamide, N-vinyl pyrrolidone, vinyl acetate, vinyl acid, acrylate esters, allyl alcohol, N-vinyl acetamide, N-vinylformamide), cationic monomers (quaternized or salified ADAME or MADAME, DADMAC, APTAC, MAPTAC), optionally combined with one or more hydrophobic monomer(s) preferably chosen from the group comprising the esters of alkyl chain, arylalkyl and/or ethoxylated methacrylic acid, the derivatives of alkyl chain, arylalkyl or dialkyl methacrylamide, the allyl cationic derivatives, the derivatives of anionic or cationic hydrophobic methacryloyl, or the anionic and/or cationic monomers derived from methacrylamide bearing a hydrophobic chain.

In using the polymers of the prior art, the inventors nevertheless observed a problem of sedimentation when the suspensions are kept without agitation for a period exceeding 3 days, in particular during transport thereof. A paste then forms in the bottom of the vats containing the suspensions, which makes it difficult, if not impossible, to pump them. The inventors further noted that this sedimentation problem was due to a poorly adapted rheology of the suspensions currently available and poor de-agglomeration of the lime particles.

The dispersing agents that are currently available do not make it possible to obtain fully satisfactory suspensions of aqueous lime, in particular in terms of sedimentation and rheological properties.

One aim of the present invention as further described hereinbelow is to avoid the problem of sedimentation when the lime suspensions are kept without agitation.

Another aim of the present invention as further described hereinbelow is to propose aqueous suspensions of lime that are as concentrated as possible and have a rheology suitable for their uses in industrial methods.

Surprisingly, the inventors have shown that by using a polymer with a particular structure, it was possible to obtain concentrated aqueous suspensions that are stable over time.

More specifically, the first aim of the present invention relates to the use of a hydrosoluble copolymer made up of:
monomers of methacrylic acid and/or any one of its salts,
optionally, monomers of acrylic acid and/or any one of its salts,
monomers with formula (I):

wherein:
R represents a polymerizable unsaturated function, in particular acrylate, methacrylate, methacryl-urethane, vinyl or allyl,
R' designates hydrogen or an alkyl group having n unit(s) of ethylene oxide EO and m unit(s) of propylene oxide PO, positioned randomly or regularly,
m and n are two non-zero integers and comprised between 1 and 150, to prepare an aqueous suspension of calcium hydroxide from powdered calcium hydroxide.

The present invention also relates to an aqueous suspension of calcium hydroxide, comprising at least one copolymer made up of:
monomers of methacrylic acid and/or any one of its salts,
optionally, monomers of acrylic acid and/or any one of its salts,
monomers with formula (I):

wherein:
R represents a polymerizable unsaturated function, in particular acrylate, methacrylate, methacryl-urethane, vinyl or allyl,
R' designates hydrogen or an alkyl group having from 1 to 4 carbon atoms,
X represents a structure comprising n unit(s) of ethylene oxide EO and m unit(s) of propylene oxide PO, positioned randomly or regularly,
m and n are two non-zero integers and comprised between 1 and 150.

The inventors in fact realized that for aqueous suspensions to have the expected properties relative to stability over time and concentration, it was necessary to disperse the calcium hydroxide particles in the presence of a hydrosoluble comb copolymer of having a backbone of methacrylic acid and poly(alkylene glycol) side chains with a particular structure.

"Powdered calcium hydroxide" refers to slaked lime particles. Slaked lime is a lime made up of a set of solid particles, primarily calcium hydroxide Ca(OH)$_2$, which is the result of the reaction of quicklime particles with water, that reaction being called hydration or slaking. Slaked lime is also called hydrated lime. In general, the slaked lime may contain impurities, which primarily result from the quicklime, for example magnesium, magnesium oxide, Al$_2$O$_3$, Fe$_2$O$_3$, MgO, S, SiO$_2$, Mn$_3$O$_4$, silicates, etc. Slaked lime may assume a powdered form or take the form of an aqueous suspension, called milk of lime.

In the context of the present invention, the slaked lime is dispersed in powdered form in an aqueous solution so as to obtain a concentrated milk of lime that is stable over time. The starting mineral material may for example be a powdered slaked lime that is commercially available. Examples include the slaked lime sold under the names Supercalco® 97, Supercalco® 97/20, Sorbacal® SP, Standard Hydrated Lime, MicroCal® HF.

The particular methacrylic copolymer according to the invention is a hydrosoluble comb copolymer having a backbone of methacrylic acid, and optionally acrylic acid, and poly(alkylene glycol) side chains.

"Poly(alkylene glycol)" refers to a polymer of the glycol alkylene derived from an olefinic acid.

The poly(alkylene glycol) chains of the copolymer according to the present invention contain a proportion of ethylene-oxy groups and a proportion of propylene-oxy groups. The poly(alkylene glycol) chains according to the present invention may for example comprise a dominant proportion of ethylene-oxy groups associated with a secondary proportion of propylene-oxy groups. Specific examples of glycol alkylene polymers comprise: poly(alkylene glycols) having an average molecular weight of 1000, 4000, 6000, 10,000 and 20,000 g/mol; polyethylene-polypropylene glycols having an ethylene oxide percentage comprised between 20 and 80 wt % and a propylene oxide percentage comprised between 20 and 80 wt %.

It should be noted that the ethylene-oxy groups and the propylene-oxy groups of the side chains of the copolymer may be positioned randomly, regularly or in a block.

More specifically, the polymer according to the present invention is made up of:
monomers of methacrylic acid and/or any one of its salts,
optionally, monomers of acrylic acid and/or any one of its salts,
monomers with formula (I):

wherein:
R represents a polymerizable unsaturated function, in particular acrylate, methacrylate, methacryl-urethane, vinyl or allyl,
R' designates hydrogen or an alkyl group having from 1 to 4 carbon atoms,
X represents a structure including n unit(s) of ethylene oxide EO and m unit(s) of propylene oxide PO, positioned randomly or regularly,
m and n are two non-zero integers and comprised between 1 and 150.

Thus, the copolymer according to the invention has a backbone made up of methacrylic acid monomers, and optionally acrylic acid monomers. The inventors in fact realized that the presence of methacrylic acid monomers in the backbone of the copolymer according to the invention was essential to resolve the technical problem at the origin of the present invention.

According to one embodiment of the invention, the copolymer has a backbone made up exclusively of methacrylic acid monomers.

According to another embodiment of the invention, the copolymer has a backbone made up of methacrylic acid monomers and acrylic acid monomers.

Thus, in the context of the present invention, it is not possible to use a copolymer having a backbone made up exclusively of acrylic acid monomers.

The inventors further noted that the use, in the context of the present invention, of the comb-type copolymer marketed under the name Ethacryl® G (polycarboxylate dispersant by the company Coatex, which does not contain methacrylic acid monomers) is not suitable to resolve the technical problem at the origin of the present invention.

Said copolymer is obtained using the known conventional radical co-polymerization methods in solution, bulk, direct or inverse emulsion, in suspension, or by precipitation in appropriate solvents, in the presence of catalytic systems and known transfer agents, or using controlled radical polymerization methods such as reversible addition-fragmentation transfer (RAFT), atom transfer radical polymerization (ATRP), nitroxide mediated polymerization (NMP), or cobaloxime mediated radical polymerization.

It is obtained in an acid form and optionally distilled. It may also be partially or completely neutralized by one or more neutralizing agents chosen from among sodium, calcium, magnesium and potassium hydroxide and mixtures thereof, or chosen from among the amines.

According to one embodiment of the present invention, said copolymer is 100% neutralized with sodium hydroxide.

According to another embodiment of the present invention, said copolymer is partially neutralized with sodium hydroxide.

According to one embodiment, said aqueous suspension of calcium hydroxide contains a hydrosoluble copolymer concentration that varies between 0.01 and 10 wt %, based on the total weight of calcium hydroxide particles in the suspension.

According to another embodiment, said aqueous suspension of calcium hydroxide contains a hydrosoluble copolymer concentration that varies between 0.05 and 5 wt %, based on the total weight of calcium hydroxide particles in the suspension.

According to still another embodiment, said aqueous suspension of calcium hydroxide contains a hydrosoluble copolymer concentration that varies between 0.1 and 3.0 wt %, based on the total weight of calcium hydroxide particles in the suspension.

According to another embodiment, said aqueous suspension of calcium hydroxide contains a hydrosoluble copolymer concentration that varies between 0.2 and 2.0 wt %, based on the total weight of calcium hydroxide particles in the suspension.

According to another embodiment, the aqueous suspension according to the present invention is made up of an aqueous solution—for example, water, optionally additivated—, calcium hydroxide particles and a copolymer according to the present invention.

According to another embodiment, the aqueous solution according to the present invention is made up of water, particles of calcium hydroxide and a copolymer according to the present invention. According to this embodiment, the aqueous suspension does not comprise any additive other than the copolymer described in the present application, i.e., it does not, for example, comprise another polymer or dispersant.

According to one embodiment, the aqueous suspension is an aqueous suspension containing a dry content of at least 40 wt %, based on the total weight of the aqueous suspension. According to another embodiment, the aqueous suspension according to the present invention has a calcium hydroxide particle content comprised between 40 to 60 wt %, based on the total weight of the aqueous suspension.

The viscosity of said aqueous suspension measured by a Brookfield DVIII viscosimeter being comprised between 25 and 1000 mPa·s at 20° C., said suspension [can] be obtained using the method according to the present invention.

According to another embodiment, the aqueous suspension according to the present invention has a content level of calcium hydroxide particles comprised between 45 to 55 wt %, based on the total weight of the aqueous suspension.

According to one embodiment of the present invention, said copolymer has a molecular weight comprised between 30,000 and 200,000 g/mol as determined by steric exclusion chromatography (SEC).

According to another embodiment of the present invention, the copolymer has a molecular weight comprised between 30,000 and 160,000 g/mol as determined by steric exclusion chromatography (SEC).

According to one embodiment of the present invention, in said hydrosoluble copolymer, said monomer of formula (I) is such that n and m are two non-zero integers and n+m>17.

According to one embodiment of the present invention, in said hydrosoluble copolymer, the function R of said monomer with formula (I) represents the methacrylate function.

According to one embodiment of the present invention, in said copolymer, the function R' of said monomer with formula (I) represents H or $CH_3$.

According to one embodiment of the present invention, in said copolymer, said monomer with formula (I) is made up of, expressed in percentage by weight of each of its components:
   5 to 30 wt % monomers of methacrylic acid and/or any one of its salts,
   0 to 10 wt % monomers of acrylic acid and/or any one of its salts,
   70 to 95 wt % monomers with formula (I).

According to one embodiment of the present invention, in said copolymer, said monomer of formula (I) is made up of, expressed in percentage by weight of each of its components:
   7 to 22 wt % monomers of methacrylic acid and/or any one of its salts,
   0 to 5 wt % monomers of acrylic acid and/or any one of its salts,
   78 to 93 wt % monomers with formula (I).

A third object of the present invention also relates to the use of the aqueous suspension of slaked lime according to the invention in the following applications.

The suspensions may be used in the treatment of power plant fumes for plants using fuels (in particular coal) for example containing sulfur and other impurities that generate acid molecules (sulfur dioxide, sulfur trioxide, sulfuric acid, hydrochloric acid, hydrofluoric acid, etc.) or pollutants (mercury, heavy metals, etc.).

They may also be used in household or industrial waste incineration plants that generate the same types of pollutants, additionally with dioxins. Using lime in a concentrated aqueous suspension, sprayed into the fumes, makes it possible to trap the pollutants, which are then eliminated in the solid residues produced by the reaction with the lime and the partial or total drying of said reaction products.

The suspensions may be used as neutralizing agents for acid reaction products, allowing their elimination and solid and/or neutralized form or their use in the form of calcium salt (for example as neutralized sulfonates and phenates as additives for lubricant products). Non-exhaustively, examples include the neutralization of acid sludge resulting from the manufacture of titanium dioxide, and the neutralization of acid solutions produced during methods for manufacturing chemical products.

The aqueous solutions according to the present invention may be used as neutralizing agents for mining effluents, with the aim of neutralizing the acidity and/or separating the heavy metals in solution before discharging the fluids into the natural environment or lagoon.

The suspensions may be used in water decarbonatation methods, these methods making it possible to reduce the temporary hardness of the water (partial or complete elimination of bicarbonates of the alkaline-earth metals). The water thus treated is intended to be used as potable or industrial water, optionally after readjusting the pH using carbon dioxide or any other acid suitable for the final application.

The purification treatment for potable water, wastewater or industrial water creates residue called sludge. The sludge is first separated from the purified water, then treated so as to stabilize and concentrate it. The method for treating this sludge is generally called conditioning and uses organic and/or mineral additives.

The present invention also relates to the use of the aqueous suspension of slaked lime according to the invention to condition the sludge from wastewater treatment plants. The lime in suspension is used first to favor the flocculation of the sludge, and secondly to sterilize said sludge using the pH by keeping said sludge at a pH of 12 or more for 24 to 72 hours or more.

The suspensions may be used in the treatment of aggregates used during the production of bituminous coatings. The adhesion of the bituminous emulsions on the aggregates is greatly improved when these aggregates are treated beforehand using lime. This better adhesion leads to bituminous coatings that are more resistant to wear and deformation, and which have a prolonged physical integrity.

The aqueous solutions according to the present invention can be used to produce construction materials such as cellular concrete. The lime is mixed with cement, sand and aluminum powder. The high pH of the mixture causes a gaseous release of hydrogen by etching of the aluminum, and the aerated paste thus produced is molded, then autoclaved to create parts made from cellular concrete.

The aqueous solutions of the present invention may be used in the treatment of contaminated soils so as to neutralize the acidity of the soils, immobilize the pollutants by neutralization or flocculation, and thereby prevent the pollutants from reaching the groundwater.

The aqueous suspensions of the present invention may be used in the treatment of agricultural soils so as to correct the pH of those soils, enrich said soils by contributing a calcium or calcium magnesium source in the case of dolomitic limes, and make those soils less impermeable by flocculation of the clays that they contain.

The aqueous solutions of the present invention may be used in the treatment of surface waters, lakes, ponds and rivers for the purpose of adjusting the pH of the water to reduce the impact of the acidification of said water, acidification of pluvial or animal origin in the case of fish farming.

The aqueous suspensions according to the present invention may be used to produce food for cattle or poultry, and inter alia, as a source of calcium or of calcium and magnesium.

The aqueous suspensions according to the present invention can be used in the paper industry, for example as a component of paper pulp.

They may also be used for sugar refining.

They may also be used to produce precipitated calcium carbonate (PCC).

The present invention also relates to the use of the aqueous solution of calcium hydroxide according to the invention to treat industrial fumes, in particular for desulfurization of the fumes, or to treat household wastewater, in particular potable water, or industrial water.

The present invention also relates to a method for treating gases or fumes comprising a step consisting of injecting/spraying an aqueous solution of slaked lime according to the invention into the gases or fumes to be treated so as to eliminate the acid compounds, sulfur oxides, hydrochloric acids, etc. therefrom.

Another aim of the present invention relates to a method for preparing an aqueous suspension of calcium hydroxide according to the invention.

More specifically, the present invention relates to a method for preparing an aqueous solution of calcium hydroxide, comprising the following steps:
  a) preparing an aqueous solution containing a copolymer according to the invention, and
  b) mixing calcium hydroxide in powdered form with said aqueous solution of step a).

According to one embodiment, said method further comprises the step consisting of subjecting the suspension to homogenous shearing.

In the context of the present invention, and according to this embodiment, homogenous shearing results in applying the same minimal mechanical strains for all of the parts of the aqueous suspension mistreated.

According to another embodiment, said method further comprises the step consisting of subjecting the suspension to homogenous shearing with a degree of shearing greater than $50,000$ $s^{-1}$.

Such a degree of shearing makes it possible to obtain a suspension having a high slaked lime content, which does not settle and is stable over time. Applying such a degree of shearing to the suspensions of slaked lime, combined with the use of a hydrosoluble copolymer with a particular chemical structure, therefore makes it possible to achieve these aims. The rheological properties of the resultant dispersion over time are thereby significantly optimized.

According to one embodiment, a homogenous shearing with a degree of shearing greater than $60,000$ $s^{-1}$, in particular greater than $70,000$ $s^{-1}$, is applied.

The homogenous shearing required according to this embodiment of the present invention may be obtained according to several alternatives.

According to a first alternative, it is possible to consider subjecting the suspension to a constant shearing rate.

However, the invention is not limited to this particular embodiment.

However, at a given moment, the shearing rate may be different for two points of the suspension. Thus, by varying the geometry of the device used to generate the shearing forces, it is possible to modulate the shearing rate applied to said dispersion in time and/or space.

Because the dispersion is fluid when it undergoes the shearing, each part thereof may thus experience a shearing rate that varies over time. The shearing is said to be homogenous when, irrespective of the variation of the shearing rate over time, it passes through a minimum value that is the same for all parts of the dispersion, at a given moment that may differ from one location of the dispersion to another.

It is possible to consider introducing the suspension of aqueous lime into the shearing device in the form of a whole aqueous suspension (the entire suspension is introduced into the device) or in the form of a primary aqueous suspension (only part of the suspension is introduced into the device).

The shearing device may have varied configurations. The exact configuration is not essential according to the invention inasmuch as at the output of that device, the entire dispersion has undergone the same minimal shearing.

As an illustration, but non-limitingly, devices that may be implemented according to the invention to apply homogenous shearing in particular include the IKA® Magic Lab mixer and the Dispax Reactor® DR2000.

According to one embodiment of the present invention, a mixer of the rotor-stator type is used to perform said homogenous shearing, for example with a degree of shearing greater than 50,000 s$^{-1}$ According to another embodiment, a mixer is used made up of several rotor-stator pairs in direct series.

According to one embodiment of the present invention, a mixer is used made up of cylindrical parts that have a tangential speed greater than 40 m/sec.

A mixer of the rotor-stator type is generally made up of two concentric discs delimiting an enclosure in which the primary dispersion circulates. One of the discs is stationary (stator), and the other is driven by a uniform rotating movement around its axis (rotor). Such a device comprises a supply duct for providing product (in this case, lime suspension) through which the upper disc passes to emerge in the central part of the enclosure. The suspension passes through the air gap formed between the stator and the rotor. The rotor (part of the device driven by a motor) and the stator (stationary part) are respectively made up, on their outer ring, of slits that allow the circulation of the lime suspension to be sheared. Such a device also comprises an output duct connected to a reservoir intended to receive the suspension thus sheared.

The shearing device may comprise a recirculation loop that makes it possible to multiply the passages into the shearing device.

Thus, according to one embodiment, the device used to perform said homogenous shearing is equipped with a recirculation loop.

The method according to any one of the preceding claims, wherein a device configured for a power expenditure of at least 1000 W/m$^3$ is used to perform said homogenous shearing.

FURTHER EXAMPLES

In all of the trials that follow, the suspensions were evaluated using the parameters described below.

The viscosity (expressed in mPa·s) of the suspension is measured at 20° C. with a Brookfield DVIII-type viscosimeter. The viscosity values indicated are measured before agitation or after agitation, at a speed of 10 rpm and 100 rpm, and at different storage times. The viscosity values after 1 month of storage and after agitation of the suspension (using equipment of the Rayneri type, for example) are particularly relevant to evaluate characteristics of the invention (influence of the polymer, influence of the equipment, influence of the minimum degree of shearing) in light of the use of the suspensions in industrial methods.

The sedimentation of each suspension is evaluated by measuring the height of the deposition in the container. The sedimentation values are expressed in %, i.e., as the ratio of a deposition height to the total height of the suspension in the container, multiplied by 100.

Example 1a

This example illustrates the use of different polymers (prior art, invention, outside invention) in a method for preparing an aqueous suspension of calcium hydroxide (slaked lime) according to the invention.

Several aqueous solutions of calcium hydroxide, each having a solid content of 48±1%, are prepared in this example. 503 g of water, as well as a quantity of the polymer corresponding to 1.41 wt % dry (based on the total weight of the solids in the suspension), are placed in a container, said polymer being a polymer of the prior art or a polymer according to the present invention. Next, 485 g of slaked lime (Supercalco® 97, Carmeuse) is placed in the container with agitation.

An IKA® Magic Lab-type mixer adjusted so as to produce shearing of 82,000 s$^{-1}$ is next supplied with the mixture obtained in the preceding step. A recirculation loop allows several passages in the air gap formed by the rotor and the stator of the IKA mixer.

Once sheared, the suspension is stored so that these viscosity, sedimentation and 1-month stability parameters can be evaluated.

The polymers used in example 1 have the following characteristics:

Test 1-1:

This test illustrates the use, in a method according to the invention, of a homopolymer outside the invention, commercially available under the name Rheosperse® 3010, Coatex, France and made up of monomers of acrylic acid, 100% neutralized with sodium hydroxide (molecular weight: 4000 g/mol).

Test 1-2:

This test illustrates the use, in a method according to the invention, of a copolymer outside the invention, commercially available and made up of monomers of acrylic acid and macromonomers with vinyl-PEG$_{2000}$ structure, i.e., monomers including 46 units of ethylene oxide.

Thus, this comb polymer does not include monomers of methacrylic acid on the one hand, and units of propylene oxide on the other hand, on its macromonomers.

Test 1-3:

This test illustrates the use, in a method according to the invention, of a copolymer outside the invention, commercially available and made up of 15 wt % of acrylic acid monomers and methacrylic acid monomers, as well as 85 wt % of macromonomers of MPEG$_{5000}$ (i.e., methoxy(EO)$_{113}$ units).

Thus, this comb polymer does not include propylene oxide units on its macromonomers.

Tests 1-4 to 1-8: Copolymers with a Particular Structure, According to the Invention or Outside the Invention These tests illustrate the use of hydrosoluble copolymers, according to the invention or outside the invention, having:

a negatively charged backbone made up of monomers of acrylic acid and/or methacrylic acid, randomly polymerized, and non-charged side chains made up of poly(alkylene glycol) units.

Test 1-4: Outside Invention

The copolymer has the following composition (in wt % relative to the total weight of the copolymer):

12.8% acrylic acid monomers, 87.2% monomers with formula (I): R—X—R', wherein R represents a methacrylate function, R' designates hydrogen, X represents a structure including 46 units of ethylene oxide EO and 15 units of propylene oxide PO, positioned randomly.

Molecular weight: 38,000-52,000 g/mol

Partial NaOH neutralization; pH: 3-4.5.

This copolymer, which does not include methacrylic acid monomers, is a copolymer outside the invention.

Test 1-5: According to the Invention

The copolymer has the following composition (in wt % relative to the total weight of the copolymer):

This copolymer, whereof the monomers with formula (I) do not include propylene oxide units, is a copolymer outside the invention.

The sedimentation results and various viscosity measurements are shown in table 1 below:

TABLE 1

| Tests | | Sedimentation T0 | viscosity afag T0 10 rpm | viscosity afag T0 100 rpm | viscosity befag T0 + 1 m 10 rpm | viscosity befag T0 + 1 m 100 rpm | viscosity afag T0 + 1 m 10 rpm | viscosity afag T0 + 1 m 100 rpm |
|---|---|---|---|---|---|---|---|---|
| 1-1 | PA | 15% | 10 | 58 | 1000 | 124 | 2770 | 382 |
| 1-2 | PA | 0 | 9840 | 1140 | 21000 | 4550 | 11020 | 1146 |
| 1-3 | PA | 0 | 1940 | 386 | 17800 | 3820 | 7220 | 1000 |
| 1-4 | OINV | 0 | 290 | 170 | 19000 | 3310 | 16460 | 1900 |
| 1-5 | INV | 0 | 300 | 159 | 4620 | 890 | 590 | 230 |
| 1-6 | INV | 0 | 250 | 152 | 1320 | 478 | 730 | 234 |
| 1-7 | INV | 0 | 170 | 114 | 1260 | 462 | 330 | 170 |
| 1-8 | OINV | 0 | 30 | 40 | 1900 | 802 | 470 | 202 |

PA: prior art
OINV: outside invention
INV: invention
afag: after agitation
befag: before agitation 7.44% of methacrylic acid monomers,
92.56% monomers with formula (I): R—X—R', wherein R represents a methacrylate function, R' designates hydrogen, X represents a structure including 46 units of ethylene oxide EO and 15 units of propylene oxide PO, positioned randomly.
Molecular weight: 110,000-150,000 g/mol
Partial NaOH neutralization; pH: 3-4.5.

Test 1-6: According to the Invention

The copolymer has the following composition (in wt % relative to the total weight of the copolymer):
19.8% methacrylic acid monomers,
3% acrylic acid monomers, and
77.2% monomers with formula (I): R—X—R', where R represents a methacrylate function, R' designates hydrogen, X represents a structure including 46 units of ethylene oxide EO and 15 units of propylene oxide PO, positioned randomly.
Molecular weight: 34,000-44,000 g/mol
Total NaOH neutralization; pH: 7.7.

Test 1-7: According to the Invention

The copolymer has the following composition (in wt % relative to the total weight of the copolymer):
12.5% methacrylic acid monomers,
87.5% monomers with formula (I): R—X—R', wherein R represents a methacrylate function, R' designates hydrogen, X represents a structure including 46 units of ethylene oxide EO and 15 units of propylene oxide PO, positioned randomly.
Molecular weight: 60,000-95,000 g/mol
Total NaOH neutralization; pH: 6.7-7.7.

Test 1-8: Outside Invention

The copolymer has the following composition (in wt % relative to the total weight of the copolymer):
24% methacrylic acid monomers,
4.3% acrylic acid monomers, and
71.7% monomers with formula (I): R—X—R', wherein R represents a methacrylate function, R' designates H, X represents a structure including 46 units of ethylene oxide EO.
Neutralization: 100% NaOH
Molecular weight: 17,900 g/mol One can first see that the polymers of tests 1-1 (homopolymers of acrylic acid) and 1-8 (copolymers not including propylene oxide and its side chains) do not make it possible to avoid sedimentation. Using these polymers therefore does not make it possible to resolve the technical problem at the origin of the present invention.

The measurement of the viscosity 10 rpm after agitation and at T0 shows that the polymers of tests 1-2 and 1-3 do not make it possible to obtain suspensions of slaked lime having rheological characteristics allowing them to be used in industrial methods, in particular rheological characteristics suitable for pumping of the suspensions. The suspension obtained in test 1-2 using the prior art polymer in fact has a viscosity of 9840 mPa·s at T0 after agitation. The suspension obtained in test 1-3 using another prior art polymer in turn has a viscosity of 1940 mPa·s at T0 after agitation. These values, which are outside the range of claimed viscosities (between 25 and 1000 mPa·s at 20° C.), are incompatible with the expected use of the suspensions.

The measurement of the viscosity 10 rpm after agitation and T0+1 month shows that the polymer of test 1-4 does not make it possible to obtain a concentrated suspension of lime that has a suitable viscosity. In fact, this viscosity is 16,460 s$^{-1}$.

The rheological profiles of the lime suspensions of tests 1-5, 1-6 and 1-7 (use of a copolymer according to the invention) are suitable for the use of suspensions in industrial methods.

Example 2a

This example illustrates the use of shearing equipment, which may be identical or different, optionally adjusted to different degrees of shearing to prepare an aqueous suspension of calcium hydroxide (slaked lime) containing a copolymer according to the invention.

A first series of three aqueous suspensions of calcium hydroxide (tests 2-1 to 2-3), each having a solid content of 48±1%, are prepared by placing 503 g of water and a quantity of a polymer that corresponds to 1.41 wt % dry (based on the total weight of the solids in the suspension) in a container. Said polymer is that of test 1-5. Next, 485 g of slaked lime (Supercalco® 97, Carmeuse) is placed in the container with agitation.

The second series of three aqueous suspensions of calcium hydroxide (tests 2-4 to 2-6), each having a solid content of 48±1%, are prepared by placing 503 g of water and a quantity corresponding to 1.41 wt % dry of a polymer (based on the total weight of the solids in the suspension) in a container, said polymer being that of test 1-6. Next, 485 g of slaked lime (Supercalco® 97, Carmeuse) is placed in the container with agitation.

Tests 2-1 and 2-4

A mixer of the Ultraturax® type (rotor-stator type), adjusted so as to produce shearing of approximately 40,000 $s^{-1}$ and which procures homogenous shearing according to the definition of the present invention, is supplied with the mixture obtained in the preceding step.

A recirculation loop allows several passages in the mixer. The recirculation time is set at 15 minutes.

Tests 2-2 and 2-5

A mixer of the Rayneri® type, adjusted so as to produce shearing of approximately 3000 $s^{-1}$ (which does not procure homogenous shearing according to the definition of the present invention), is supplied with the mixture obtained in the preceding step.

A recirculation loop allows several passages in the mixer. The recirculation time is set at 15 minutes.

Tests 2-3 and 2-6

A mixer of the IKA® Magic Lab type, adjusted so as to produce shearing of 82,000 $s^{-1}$ and which procures homogenous shearing according to the definition of the present invention, is then supplied with the mixture obtained in the preceding step.

A recirculation loop allows several passages in the air gap formed by the rotor and stator of the IKA mixer. The recirculation time is set at 15 minutes.

Once sheared, the suspensions are stored for evaluation of the viscosity, sedimentation, and 1-month stability month parameters.

The results for sedimentation and various viscosity measurements are provided in table 2 below:

TABLE 2

| Tests | Sedimentation T0 | viscosity afag T0 10 rpm | viscosity afag T0 100 rpm | viscosity befag T0 + 1 m 10 rpm | viscosity befag T0 + 1 m 100 rpm | viscosity afag T0 + 1 m 10 rpm | viscosity afag T0 + 1 m 100 rpm |
|---|---|---|---|---|---|---|---|
| 2-1 OINV | 30% | 70 | 107 | 3300 | 560 | 430 | 168 |
| 2-2 OINV | 20% | 50 | 98 | 2400 | 236 | 790 | 220 |
| 2-3 INV | 0 | 300 | 159 | 4620 | 890 | 590 | 230 |
| 2-4 OINV | 30% | 650 | 162 | 1600 | 580 | 1890 | 380 |
| 2-5 OINV | 30% | 260 | 107 | 19300 | 1800 | 1000 | 240 |
| 2-6 INV | 0 | 250 | 152 | 1320 | 478 | 730 | 234 |

OINV: outside invention
INV: invention
afag: after agitation
befag: before agitation One can first see that the degree of shearing used in tests 2-1 and 2-4 (Ultraturax® adjusted to 40,000 $s^{-1}$) and tests 2-2 and 2-5 (mixer 3000 $s^{-1}$) does not make it possible to avoid sedimentation.

However, the degree of shearing of tests 2-3 and 2-6 (RA adjusted to 82,000 $s^1$), combined with the use of the polymer with a particular structure, makes it possible not only to avoid the problem of sedimentation, but also to obtain suspensions whereof the rheological profile is suitable for the expected use.

Example 3a

This example illustrates the use of two polymers according to the invention in a method for preparing an aqueous solution of calcium hydroxide (slaked lime) with a high content of dry matter (>50 wt %).

Two aqueous suspensions of calcium hydroxide, each having a solid content of 50 to 51%, are prepared in this example. 478 g of water, as well as a quantity corresponding to 1.41 wt % dry of a polymer, based on the total weight of the solids in the suspension, are placed in a container. Next, 505 g of slaked lime (Supercalco® 97, Carmeuse) is placed in the container with agitation.

A mixer of the IKA® Magic Lab type, adjusted so as to produce shearing of 82,000 $s^{-1}$, is next supplied with the mixture obtained in the preceding step. A recirculation loop allows several passages in the air gap formed by the rotor and the stator of the IKA mixer.

Once sheared, the suspension is stored for evaluation of its viscosity, sedimentation, and 1-month stability parameters.

The polymers used in this example have the following characteristics:

Test 3-1: According to the Invention

The copolymer has the following composition (in wt % relative to the total weight of the copolymer):

7.44% methacrylic acid monomers,
92.56% monomers with formula (I): R—X—R', wherein R represents a methacrylate function, R' designates hydrogen, X represents a structure including 46 units of ethylene oxide EO and 15 units of propylene oxide PO, positioned randomly.

Molecular weight: 110,000-150,000/gmol
Partial NaOH neutralization; pH: 3-4.5.

Test 3-2: According to the Invention

The copolymer has the following composition (in wt % relative to the total weight of the copolymer):

19.8% monomers of methacrylic acid,
3% monomers of acrylic acid, and
77.2% monomers with formula (I): R—X—R', wherein R represents a methacrylate function, R' designates hydrogen, X represents a structure including 46 units of ethylene oxide EO and 15 units of propylene oxide PO, positioned randomly.

Molecular weight: 34,000-44,000 g/mol
Total NaOH neutralization; pH: 7.7.

The results for sedimentation and various viscosity measurements are shown in table 3 below:

TABLE 3

| Tests | Sedimentation T0 | viscosity afag T0 10 rpm | viscosity afag T0 100 rpm | viscosity befag T0 + 1 m 10 rpm | viscosity befag T0 + 1 m 100 rpm | viscosity afag T0 + 1 m 10 rpm | viscosity afag T0 + 1 m 100 rpm |
|---|---|---|---|---|---|---|---|
| 3-1 50.4% lime | 0% | 980 | 393 | 4900 | 1980 | 1930 | 687 |
| 3-2 50.56% lime | 0% | 530 | 261 | 13600 | 3048 | 3300 | 839 | afag: after agitation
befag: before agitation

The results demonstrate that it is possible, using the method according to the present invention, and using hydrosoluble copolymers with a particular structure, to prepare suspensions of slaked lime with a high concentration that remain stable over time.

Example 4a

This example illustrates the use of two polymers according to the invention in a method for preparing an aqueous suspension of calcium hydroxide from two different types of starting slaked lime, i.e., a lime having a mean particle diameter between 4 and 5 μm (Supercalco® 97, Carmeuse) and a lime having a mean particle diameter between 2 and 3 μm (Supercalco® 97/20, Carmeuse).

Several aqueous suspensions of calcium hydroxide, each having a solid content of 48±1%, are prepared in this example. 503 g of water, as well as a quantity corresponding to 1.41 wt % dry of a polymer (based on the total weight of the solids in the suspension), are placed in a container. Next, 485 g of slaked lime, specifically Supercalco® 97 (Carmeuse) in tests 4-1 and 4-3, or Supercalco® 97/20 (Carmeuse) in tests 4-2 and 4-4, is placed in the container with agitation.

A mixer of the IKA® Magic Lab type, adjusted so as to produce a shearing of 82,000 s$^{-1}$, is next supplied with the mixture obtained in the preceding step.

A recirculation loop allows several passages in the air gap formed by the rotor and the stator of the IKA mixer.

Once sheared, the suspension is stored for evaluation of these viscosity, sedimentation, and 1-month stability parameters.

The polymers used in this example have the following characteristics:

Tests 4-1 and 4-2: According to the Invention
The copolymer has the following composition (in wt % relative to the total weight of the copolymer):
7.44% monomers of methacrylic acid,
92.56% monomers with formula (I): R—X—R', wherein R represents a methacrylate function, R' designates hydrogen, X represents a structure including 46 units of ethylene oxide EO and 15 units of propylene oxide PO, positioned randomly.
Molecular weight: 110,000-150,000 g/mol
Partial NaOH neutralization; pH: 3-4.5.

Tests 4-3 and 4-4: According to the Invention
The copolymer has the following composition (in wt % relative to the total weight of the copolymer):
19.8% monomers of methacrylic acid,
3% monomers of acrylic acid, and
77.2% monomers with formula (I): R—X—R' wherein R represents a methacrylate function, R' designates hydrogen, X represents a structure including 46 units of ethylene oxide EO and 15 units of propylene oxide PO, positioned randomly.
Molecular weight: 34,000-44,000 g/mol
Total NaOH neutralization; pH: 7.7.

The results for sedimentation and different viscosity measurements are shown in table 4 below:

TABLE 4

| Tests | | Sedimentation T0 | viscosity afag T0 10 rpm | viscosity afag T0 100 rpm |
|---|---|---|---|---|
| 4-1 | INV | 0% | 300 | 159 |
| 4-2 | INV | 0% | 280 | 203 |
| 4-3 | INV | 0 | 250 | 152 |
| 4-4 | INV | 0% | 190 | 126 | afag: after agitation
befag: before agitation

The results demonstrate that it is possible, according to the method of the present invention, using hydrosoluble copolymers with a particular structure, to prepare suspensions of slaked lime with a high concentration remaining stable over time, irrespective of the initial particle size of the slaked lime.

Example 5a

The purpose of this example is to illustrate the total organic carbon (TOC) levels present in the aqueous phase of the lime suspensions dispersed with the polymers of the prior art or with polymers according to the invention, and thereby to determine the free polymer concentrations in the aqueous phase.

This example also makes it possible to illustrate the soluble $Ca^{2+}$ ion content levels present in the aqueous phase of the lime suspensions dispersed with the polymers of the prior art or with the polymers according to the invention.

Method for Preparing the Suspensions

Several aqueous suspensions of calcium hydroxide, each having a solid content of 48±1%, are prepared in this example. 503 g of water, as well as a quantity corresponding to 1.41 wt % dry of a polymer (based on the total weight of the solids in the suspension), are placed in a container, said polymer being according to the prior art or the present invention. Next, 485 g of slaked lime (Supercalco® 97, Carmeuse) is introduced into the container with agitation.

A mixer of the IKA® Magic Lab type, adjusted so as to produce shearing of 82,000 s$^{-1}$, is then supplied with the mixture obtained in the preceding step. A recirculation loop allows several passages in the air gap formed by the rotor and the stator of the IKA mixer.

Test 5-1

The copolymer has the following composition (in wt % relative to the total weight of the copolymer):
7.44% monomers of methacrylic acid,
92.56% monomers with formula (I): R—X—R', wherein R represents a methacrylate function, R' designates hydrogen, X represents a structure including 46 units of ethylene oxide EO and 15 units of propylene oxide PO, positioned randomly.
Molecular weight: 110,000-150,000 g/mol
Partial NaOH neutralization; pH: 3-4.5.

Test 5-2

The copolymer has the following composition (in wt % relative to the total weight of the copolymer):
12.8% monomers of acrylic acid,
87.2% monomers with formula (I): R—X—R', wherein R represents a methacrylate function, R' designates hydrogen, X represents a structure including 46 units of ethylene oxide EO and 15 units of propylene oxide PO, positioned randomly.
Molecular weight: 38,000-52,000 g/mol
Partial NaOH neutralization; pH: 3-4.5.

This copolymer, which does not include methacrylic acid monomers, is a copolymer outside the invention.

Test 5-3

The polymer used is a homopolymer outside the invention, commercially available under the name Rheosperse® 3010, Coatex, France and made up of monomers of acrylic acid, 100% neutralized with sodium hydroxide (molecular weight: 4000 g/mol).

The obtained suspensions are filtered.

A sample of the filtrate is withdrawn and analyzed using the methods described below.

TOC Measurement:

The TOC (Total Organic Carbon) is measured using a Shimadzu TOC-V CSH, using a method based on a catalytic oxidation method by combustion at 680° C.

The carbon atoms of the samples are oxidized in $CO_2$. The eluent gas pushes the $CO_2$ into a system allowing the elimination of the $H_2O$ molecules and halogenated compounds. An IR (infrared) detector measures the $CO_2$ concentration. A calibration curve makes it possible to determine the carbon concentration in the sample.

Ion Assaying:

The ion content is evaluated using ion chromatography by using Metrohm 761 Compact IC-type equipment. The separation of the ions and the polar molecules is based on their charge.

The results of the TOC and free $Ca^{2+}$ ion content level measurements are provided in table 5 below:

TABLE 5

| Tests | | Ca2+ ppm | TOC ppm | polymer concentration ppm |
|---|---|---|---|---|
| 5-1 | INV | 1064 | 1640 | 396 |
| 5-2 | OINV | 995 | 3900 | 856 |
| 5-3 | PA | 291 | 100 | 17 |

OINV: outside invention
INV: invention
PA: prior art

It is first possible to see that the free $Ca^{2+}$ ion content levels vary significantly based on the nature of the polymer used. This free $Ca^{2+}$ ion content level in a lime suspension dispersed with an acrylic acid homopolymer (test 5-3) is low compared to that of an aqueous lime suspension dispersed with a copolymer having a methacrylic acid backbone and poly(alkylene glycol) side chains (tests 5-1 and 5-2).

Furthermore, although the quantities of starting polymer (1.41 wt % dry) are identical for each of the suspensions, it is noted that the polymer concentrations in the filtrate of each suspension vary significantly based on the polymer used. When the polymer used is an acrylic acid homopolymer, the concentration of soluble polymer in the aqueous phase is practically nonexistent. Furthermore, less free copolymer remains in the filtrate of the lime suspension when a copolymer according to the invention is used. Without being bound by any theory, one may think that the particular structure of the copolymer according to the invention is suited to the chemical nature of the lime, which improves the chemical interactions between the copolymer and the $Ca(OH)_2$ particles. There are fewer free copolymers in the lime suspensions prepared using the inventive method by using a copolymer with a particular structure, since a larger quantity thereof is adsorbed to the surface of the slaked lime particles. It has thus been demonstrated that subjecting a concentrated aqueous suspension of lime to a shearing operation under specific conditions in the presence of a copolymer according to the invention makes it possible to obtain a concentrated, stable lime suspension that is novel relative to the lime suspensions of the prior art, due to the particular chemical interactions between the copolymers and the lime particles.

Embodiment 1a

A use of a hydrosoluble copolymer made up of:
monomers of methacrylic acid and/or any one of its salts,
optionally, monomers of acrylic acid and/or any one of its salts,
monomers with formula (I):

$$R—X—R' \quad (I)$$

wherein:
R represents a polymerizable unsaturated function, in particular acrylate, methacrylate, methacryl-urethane, vinyl or allyl,
R' designates hydrogen or an alkyl group having from 1 to 4 carbon atoms,
X represents a structure including n unit(s) of ethylene oxide EO and m unit(s) of propylene oxide PO, positioned randomly or regularly,
m and n are two non-zero integers and comprised between 1 and 150, to prepare an aqueous suspension of calcium hydroxide from powdered calcium hydroxide.

Embodiment 2a

An aqueous suspension of calcium hydroxide, comprising at least one copolymer made up of:
monomers of methacrylic acid and/or any one of its salts,
optionally, monomers of acrylic acid and/or any one of its salts,
monomers with formula (I):

$$R—X—R' \quad (I)$$

wherein:

R represents a polymerizable unsaturated function, in particular acrylate, methacrylate, methacryl-urethane, vinyl or allyl, R' designates hydrogen or an alkyl group having from 1 to 4 carbon atoms, X represents a structure including n unit(s) of ethylene oxide EO and m unit(s) of propylene oxide PO, positioned randomly or regularly, m and n are two non-zero integers and comprised between 1 and 150.

Embodiment 3a

The use according to Embodiment 1a or the suspension according to claim 2, wherein said suspension has a dry content of at least 40 wt %.

Embodiment 4a

The use or suspension according to any one of the preceding Embodiments 1a-3a, wherein the viscosity of said aqueous suspension measured by a Brookfield DVIII viscosimeter at 10 rpm is comprised between 25 and 1000 mPa·s at 20° C.

Embodiment 5a

The use or suspension according to any one of the preceding Embodiments 1a-4a, wherein the copolymer has a molecular weight comprised between 30,000 and 200,000 g/mol as determined by steric exclusion chromatography (SEC).

Embodiment 6a

The use or suspension according to any one of the preceding Embodiments 1a-5a, wherein said monomer of formula (I) is such that n and m are two non-zero integers and n+m>17.

Embodiment 7a

The use or suspension according to any one of the preceding Embodiments 1a-6a, wherein the function R of said monomer with formula (I) represents the methacrylate function.

Embodiment 8a

The use or suspension according to any one of the preceding Embodiments 1a-7a, wherein the function R' of said monomer with formula (I) represents H or $CH_3$.

Embodiment 9a

The use or suspension according to any one of the preceding Embodiments 1a-8a, wherein said monomer with formula (I) is made up of, expressed in percentage by weight of each of its components:

5 to 30 wt % monomers of methacrylic acid and/or any one of its salts,
0 to 10 wt % monomers of acrylic acid and/or any one of its salts,
70 to 95 wt % monomers with formula (I).

Embodiment 10a

The use of the aqueous suspension of calcium hydroxide according to any one of Embodiment 1a, 3a to 9a, to treat industrial fumes, in particular for desulfurization of the fumes, or to treat household wastewater, in particular potable water, or industrial water.

Embodiment 11a

A method for preparing an aqueous solution of calcium hydroxide, comprising a step consisting of subjecting the suspension to homogenous shearing.

Embodiment 12a

The method according to Embodiment 11a, wherein homogenous shearing is applied with a degree of shearing greater than 50,000 $s^{-1}$.

Embodiment 13a

The method according to Embodiment 11a or 12a, wherein a mixer of the rotor-stator type is used to perform said homogenous shearing.

Embodiment 14a

The method according to any one of Embodiments 11a to 13a, wherein the device used to perform said homogenous shearing is equipped with a recirculation loop.

Embodiment 15a

The method according to any one of Embodiments 11a to 14a, wherein a device configured for a power expenditure of at least 1000 $W/m^3$ is used to perform said homogenous shearing.

The invention claimed is:

1. A process for the preparation of an aqueous slurry of calcium hydroxide, the process comprising:
  agitating a mixture of water and a copolymer to form an aqueous solution;
  adding powdered calcium hydroxide to said aqueous solution and agitating to provide an initial slurry;
  applying a homogeneous shear level greater than 50,000 $s^{-1}$ to the initial slurry; and
  optionally, while applying said shear level to said initial slurry, adding more copolymer and/or more powdered calcium hydroxide to said initial slurry,
  wherein said copolymer consists:
  of methacrylic acid monomers and/or any of its salts,
  optionally of acrylic acid monomers and/or any of its salts,
  of one or more monomers with the formula (I):

R—X—R'  (I)

wherein:
  R represents a polymerizable unsaturated group,
  R' represents hydrogen or an alkyl group with from 1 to 4 carbon atoms,
  X represents a structure with n unit(s) of ethylene oxide EO and m unit(s) of propylene oxide PO, arranged randomly or regularly, and
  m and n are independent non-zero integers and are between 1 and 150,
  and wherein said process produces an aqueous slurry of calcium hydroxide with a dry content of at least 40% by weight, the viscosity of the aqueous slurry measured by a Brookfield DVIII viscometer at 10 RPM being between 25 and 1,000 mPa·s at 20° C.

2. The process according to claim 1, wherein the copolymer has a molecular mass between 30,000 and 200,000 g/mol as determined by Gel Permeation Chromatography (GPC).

3. The process according to claim 1, wherein the monomer of formula (I) is such that n+m 17.

4. The process according to claim 1, wherein the R group of said monomer of formula (I) represents the methacrylate group.

5. The process according to claim 1, wherein the R' group of the monomer of formula (I) represents H or $CH_3$.

6. The process according to claim 1, wherein the monomer of formula (I) consists of, expressed as a percentage by weight of each of its components:
- 5 to 30% by weight of methacrylic acid monomers and/or any of its salts,
- 0 to 10% by weight of acrylic acid monomers and/or any of its salts,
- 70 to 95% by weight of monomers of formula (I).

7. The process according to claim 1, wherein a mixer of the rotor-stator type is used to apply said shear.

8. The process according to claim 1, wherein the shear is applied in a device equipped with a recirculating loop.

9. The process according to claim 1, wherein the shear is applied in a device configured to deliver an output of at least 1,000 $W/m^3$.

10. The process according to claim 1, wherein the R group of said monomer of formula (I) represents an acrylate, methacrylate, methacrylurethane, vinyl or allyl group.

\* \* \* \* \*